(12) United States Patent
Natroshvili

(10) Patent No.: US 10,907,972 B2
(45) Date of Patent: Feb. 2, 2021

(54) 3D LOCALIZATION DEVICE

(71) Applicant: Intel Corporation, Santa Clara, CA (US)

(72) Inventor: Koba Natroshvili, Waldbronn (DE)

(73) Assignee: INTEL CORPORATION, Santa Clara, CA (US)

( * ) Notice: Subject to any disclaimer, the term of this patent is extended or adjusted under 35 U.S.C. 154(b) by 232 days.

(21) Appl. No.: 15/939,362

(22) Filed: Mar. 29, 2018

(65) Prior Publication Data
US 2019/0049252 A1 Feb. 14, 2019

(51) Int. Cl.
*G01C 21/28* (2006.01)
*G01C 21/34* (2006.01)

(52) U.S. Cl.
CPC ......... *G01C 21/28* (2013.01); *G01C 21/3446* (2013.01)

(58) Field of Classification Search
None
See application file for complete search history.

(56) References Cited

U.S. PATENT DOCUMENTS

| 2013/0166137 A1* | 6/2013 | Ahn ..................... G05D 1/0246 701/32.3 |
| 2016/0166137 A1* | 6/2016 | Hakomori ............ A61B 5/0071 433/29 |
| 2019/0266418 A1* | 8/2019 | Xu ..................... G06K 9/00798 |

OTHER PUBLICATIONS

Ernst D. Dickmanns et al., "Recursive 3-D Road and Relative Ego-State Recognition", IEEE Transactions on Pattern Analysis and Machine Intelligence, Feb. 1992, pp. 199-213, vol. 14 No. 2.
R. G. Brown, "Linearization and additional Intermediate-Level Topics", Introduction to Random Signals and Applied Kalman Filter, 1997, pp. 376-377, Chapter 9.
Tanzmeister: "Grid Based Environment Estimation for Local Autonomous Vehicle Navigation", Fortschrittberichte VDI, 2016, cover page and p. 17, Reihe 8, No. 1246, Düsseldorf.

* cited by examiner

*Primary Examiner* — Jonathan M Dager
*Assistant Examiner* — Garrett F Evans
(74) *Attorney, Agent, or Firm* — Viering, Jentschura & Partner MBB

(57) ABSTRACT

A method for sensing the position of a vehicle on a three-dimensional map is provided, which may include receiving, from one or more sensors, sensor information about a three-dimensional position of the vehicle; and applying a distributed Kalman filter to the sensor information to determine the position of the vehicle on the three-dimensional map.

20 Claims, 10 Drawing Sheets

3D LOCALIZATION DEVICE

TECHNICAL FIELD

Various aspects of this disclosure relate generally to a 3D localization device for fully or partially autonomous vehicles.

BACKGROUND

The precise localization on a map for fully or partially autonomous vehicles is very important since it connects the reality of the roads with the route planning and the controlling of the vehicle. In this context, localization has to be intended as a very broad idea, localizing the Autonomous Vehicles (AV) both on the road, for example at a given kilometre marking, or at a given distance from an intersection, but also in a given position in the road, for example on the passing lane or in the left turning lane or in the lane exiting to the airport. As general reference point, the requirement for localization is to tolerate an error of at most 10 cm in either direction.

In principle there are simple ways to address the localization problem such as using the Global Positioning System (GPS) or similar system such as Galileo, the Global Navigation Satellite System (GLONASS), the Beidou System or variants such as Differential GPS. But such systems come with a number of problems: for example, they have an intrinsic error; in addition, their coverage does not extend to indoor localization, as for example localization in a tunnel.

Alternative conventional ways to address this scenario are to use the vehicle odometry which reports the speed of movement of the vehicle, and the direction of the vehicle, as well as the sensors on the vehicle, such as for example the mono-camera, Lidar, and Radar sensors. Each one of these sensors comes with its own set of issues and errors, to be dealt with; furthermore, some sensors, e.g. the odometry sensors, are dependent on the 3D structure of the road, therefore they tend to carry an additional error when the location is projected to 2D maps.

SUMMARY

A method for sensing the position of a vehicle on a three-dimensional map is provided, which may include receiving, from one or more sensors, sensor information about a three-dimensional position of the vehicle; and applying a distributed Kalman filter to the sensor information to determine the position of the vehicle on the three-dimensional map.

BRIEF DESCRIPTION OF THE DRAWINGS

In the drawings, like reference characters generally refer to the same parts throughout the different views. The drawings are not necessarily to scale; emphasis is instead generally being placed upon illustrating the principles of the disclosure. In the following description, various embodiments of the disclosure are described with reference to the following drawings, in which.

DESCRIPTION

The following detailed description refers to the accompanying drawings that show, by way of illustration, specific details and embodiments in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs.

Whereas the description and the figures refer to an Automatic Driving (AD) example, it should be understood that the 3D localization device disclosed as well as the examples disclosed in general may be used fully or partially, in other words using only some components, in a wide range of applications including security cameras that may use the 3D localization device to locate objects in a given map of a pre-specified area, traffic lights that that may use the 3D localization device to monitor the traffic waiting at an intersection, smart digital signage for both advertisement and information purposes that may use the 3D localization device to estimate the number of impressions or to derive the most relevant content to display, traffic congestion sensors that may use the 3D localization device to estimate the traffic in a given area, speedometers that may use the 3D localization device to compute the correct speed of vehicles in a given area. Furthermore, it should be noted that the examples may also be provided for the description of the environment in general, e.g. for tracking of objects in the environment.

Despite the wide range of application of the 3D localization device, the rest of the description will concentrate on the embodiment in which the 3D localization device is used as component of an exemplary vehicle.

Figure 1:
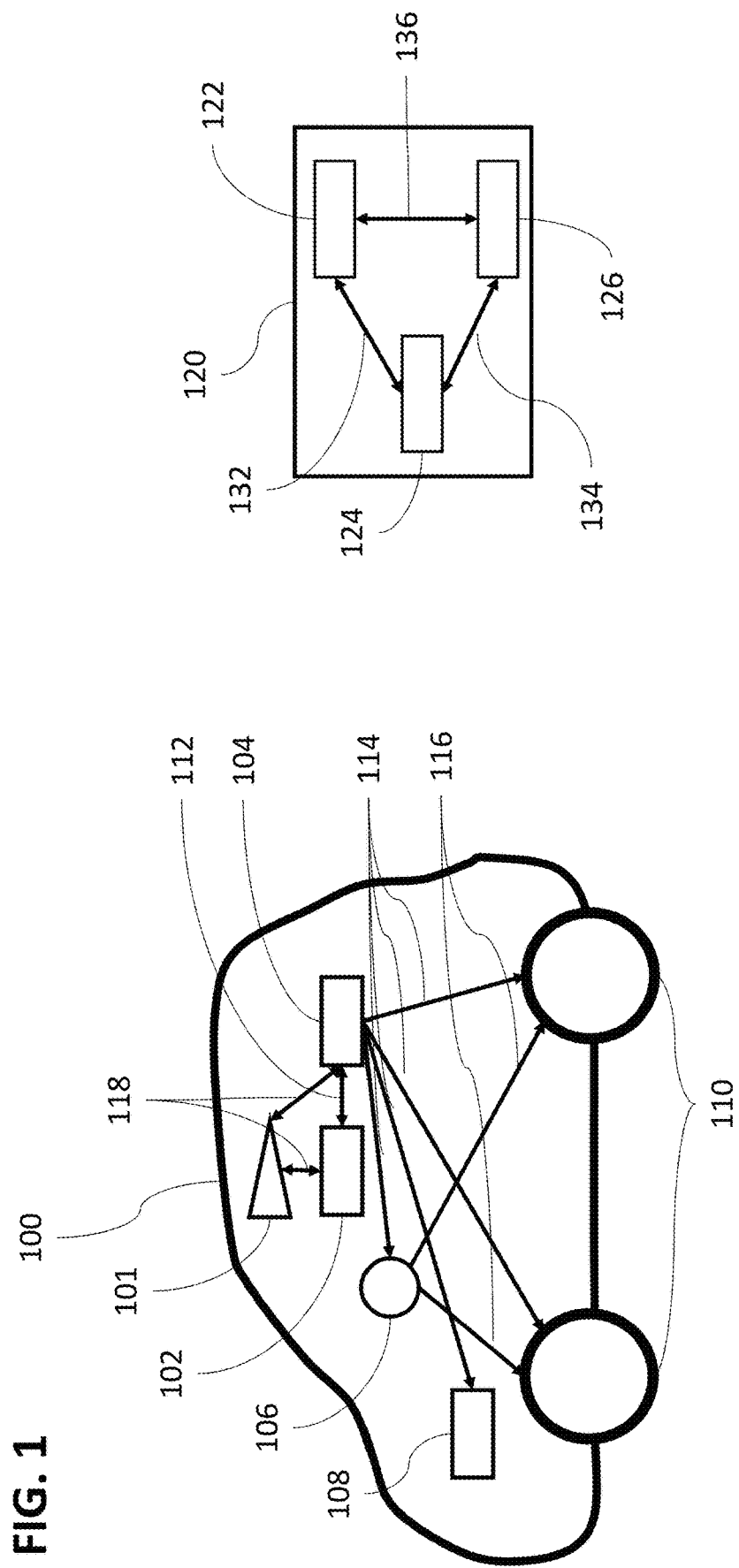
FIG. 1 shows an exemplary vehicle (e.g. an autonomous vehicle) including a 3D localization device, and a diagram showing an embodiment of a 3D localization device.

FIG. 1 shows an exemplary vehicle (e.g. an autonomous vehicle) 100 and a diagram showing an embodiment of a 3D localization device 120. The exemplary vehicle includes a sensor module 101, a 3D localization device, to localized the vehicle on a three dimensional map, 102, an automotive controller 104 of the automatic driving vehicle 100, as well as various automotive components such as a steering module 106, a motor 108, and wheels 110 which may also include a braking system and a turning system both of which are not displayed.

In the embodiment of vehicle 100 displayed in FIG. 1 the sensor module 101, the perception device, 102, and the automotive controller 104 are displayed as three distinct components. It should be understood that in some embodiments of vehicle 100 the three components 101, 102, and 104 may be integrated in different ways. For example, in some embodiments the sensors 101 and the perception device 102 may be integrated in a single perception module; in other embodiments the perception device 102 may be integrated in the automotive controller 104; in yet other embodiments both the sensors 101 and the perception device 102 may be integrated in the automotive controller 104. In other embodiments all other forms of integration may be adopted.

The description of the vehicle 100 below is limited to the components that are relevant to this description. It should be understood that the automatic driving vehicle 100 may include various other components which are not described. Furthermore, the automatic vehicle 100 may be an automatic driving car, an automatic drone, an automatic plane or other flying object, an automatic bike, trike, or the like. As an alternative, the automatic vehicle 100 may be any kind of robot or moving hardware agent. Furthermore, it is to be noted that the vehicle 100 does not necessarily need to be an automatic vehicle, but can also be a partially automatic vehicle or a vehicle which implements the 3D localization device as part of its driver assistance systems. Furthermore, the disclosure below may be relevant for any device requiring a map of a given area, such as surveillance devices which may monitor a specific location. As opposed to vehicles that constantly change position, such devices may be fixed in a specific position.

The sensors module 101 may include a plurality of sensors such as mono-camera, Lidar sensor, Radar sensors, as well as positioning sensors that may be implemented in relation to satellite based positioning systems such as GPS, Galileo, GLONASS, Beidou or variants of these systems such as the Differential GPS, or other types of positioning systems such as positioning systems based on Cellular technology, or other types of technologies. The sensors module may also include sensors about the movement of the vehicle such as odometry sensors such as one or more Inertial Measurement Units (IMU) including sensors such as accelerometers, gyroscopes, and magnetometers, as well as visual odometry sensors. The sensor module may include a range of additional sensors monitoring the correct functioning of the vehicle, as well as other sensors that may be required by the vehicle.

The 3D localization device 102 is functionally similar to the embodiment of the 3D localization device 120. The 3D localization device 120 may include a memory 122 that may be configured to store one or more the three-dimensional maps, where the maps include map points identified by longitude information, latitude information and height information; and one or a plurality of pathways wherein each pathway has a boundary and a pathway boundary is defined by one or more lines connecting at least two map points with each other. The 3D localization device 120 may also include a receiver 124 that may be configured to receive from one or more sensors, sensor information about a three-dimensional position of the vehicle; and one or more processors 126 that may be configured to compute a distributed Kalman filter to the sensor information to determine the position of the vehicle on the three-dimensional map.

In some embodiments of the 3D localization device, the memory 122 may be augmented with a processor which may be used to compute 3D maps using the clothoid function as disclosed below in details below and in FIG. 3.

The connectors 132, 134 and 136 enable data transfer across the three components 122, 124 and 126. Exemplarily such data transfer may involve the receiver 124 receiving sensor information, the sensor information being transferred to the distributed Kalman filter which computes the position of the vehicle.

In some embodiments, the receiver of the 3D localization device 102 may be configured to receive information from a mono-camera sensing at least one of: landmarks; pathway boundaries; or pathway slope. In some embodiments, the receiver of the 3D localization device 102 may be further configured to receive information from a Lidar sensing at least one of: landmarks; physical pathway boundaries; or physical pathway slope. In some embodiments, the receiver of the 3D localization device 102 may be further configured to receive information from a position sensor configured to detect the vehicle three dimensional position using a positioning system. In some embodiments, the receiver of the 3D localization device 102 may be further configured to receive information from a sensor configured to detect at least one type of odometric information coming from the Inertial Measurement Unit of the vehicle; wherein the sensor may be configured to detect at least one type of odometric information comprising: vehicle velocity; vehicle yaw angle change; vehicle pitch angle change; vehicle acceleration in x, y, z direction; or vehicle position; furthermore, the sensor may be configured to detect at least one type of odometric information is further configured to detect visual information from one or a plurality of mono-camera sensor or one of a plurality of Lidar sensors.

The automotive controller 104 of the automatic driving vehicle 100 may be configured to control the automatic vehicle driving direction and speed, and in general to control the automotive components such as the steering module 106, the motor 108, and the wheels 110, the braking system and other systems that are included in the vehicle. The automotive controller may fully or partially control the vehicle. Full control indicates that the automotive controller controls the behaviour of all other automotive controllers, and the human driver is passive. Partial control may indicate that the automotive controller controls only some automotive components, but not others which are under control of the driver. For example, the automotive controller may be configured to control the speed, but not the steering of the vehicle and other components. This may be a level of control similar to a cruise control. In other cases, partial control may indicate that the automotive controller controls all automotive components, but only in some situations, for example, it may control the vehicle on the highway but not on other roads where the driver should take control; or that the automotive controller may control all the automotive components only in low traffic situations, while in high traffic the driver should take control.

FIG. 1 also shows an exemplary connection scheme across the different components. Such connections may be implemented as a wired connection or a wireless connection. Any kind of communication protocol (cryptographic or non-cryptographic) may be used for a communication between two respective components. Furthermore, the interaction between the components may be implemented as a remote function call or an API call across software modules or in any other way that allows transfer of information between components.

The connection 112 between the 3D localization device 102 and the automotive controller 104 may be configured to provide an exemplary information flow through which the 3D localization device 102 provides the correct position of the vehicle on the map, signalling whether the road ahead is going uphill, or downhill, or whether it is turning left or right so that the automotive controller may adjust the characteristics of the vehicle to adapt to the road ahead; where the characteristics of the vehicle may include the speed, driving direction, acceleration and all other parameters that specify how the vehicle is driving.

Each one of the connections 114 couples the automotive controller 104 with the other components, such as the steering module 106, the motor 108, and the wheels 110, and the like. The connections 114 may be configured to provide information flow from the various automotive components: e.g. the steering module 106, the motor 108, and the wheels 110 to the automotive controller 104.

The steering module 106 may communicate through 116 to a turning system (not shown) of the wheels 110 to change a respective wheel angle with respect to the direction of the automatic vehicle 100 forcing the automatic vehicle 100 to change direction. In some embodiments of the automatic driving vehicle 100, the steering module 106 may be configured to mechanically change the angle of a respective wheel 110 with respect to the direction of the automatic vehicle 100 forcing the automatic vehicle 100 to change direction. In these embodiments, the connector 116 may be a mechanic component. In other embodiments, the connectors 116 may be implemented as a communication connector. In other embodiments, the steering module 106 may be a component of a wheel's control system (not shown).

The connector 118 connects the sensors module to the 3D localization device 102, and the automotive controller 104. Connector 118 is used to transfer sensor information from the sensors to the 3D localization device 102, and the automotive controller 104. It is to be understood that the sensor module may be highly distributed within the vehicle, with sensors being placed in the most convenient place to be effective. As a consequence, connector 118 may not be a single connector but a collection of connectors connecting each individual sensor to the components that need the sensor information. Furthermore, connector 118 may be implemented using a variety of network connections and protocols to adapt to the characteristics of the sensors. Finally, although for exemplary reasons in FIG. 1 connector 118 connects the sensors to the 3D localization device 102, and the automotive controller 104, it is to be understood that also other components of the vehicle 100 may require sensor information and therefore the connector 118 may in reality be more complex than shown in FIG. 1.

The components of the vehicle, and in particular the 3D localization device may be realized by a computer readable medium storing a plurality of instructions implementing the methods required by those components. In the case of the 3D localization device, the computer readable medium stores a plurality of instructions implementing a method for sensing the position of a vehicle on a three-dimensional map, including receiving, from one or more sensors, sensor information about a three-dimensional position of the vehicle; and applying a distributed Kalman filter to the sensor information to determine the position of the vehicle on the three-dimensional map.

The computer readable medium may include a plurality of processors and/or one or a plurality of controllers. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The computer readable medium may also be a virtualized device which is executed by one or more physical devices. In addition, the computer readable medium may be a network device residing in a cloud, or it may be configured to execute some functions in the cloud for example through remote API calls.

Figure 2:
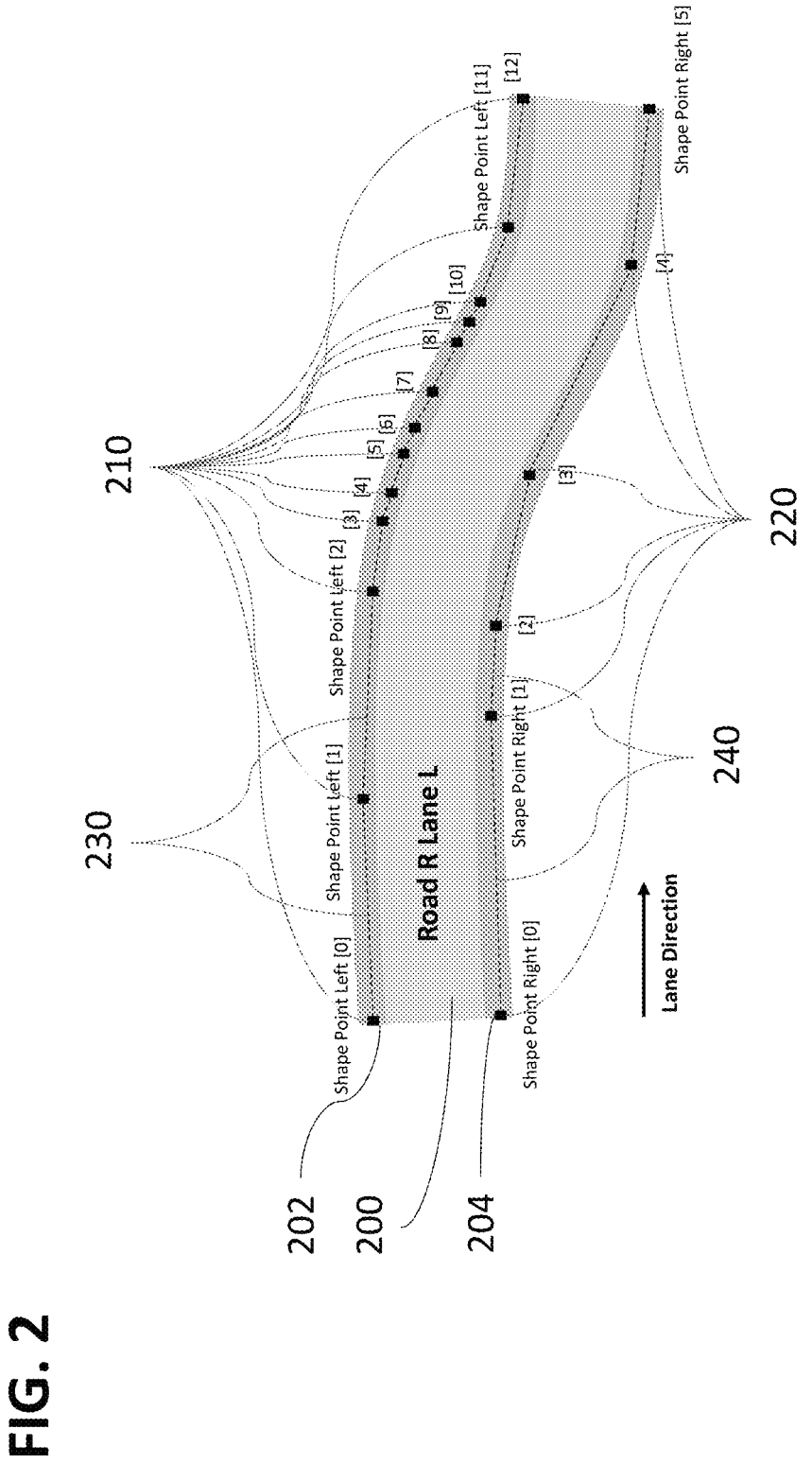
FIG. 2 shows an exemplary segment of a pathway in an Automatic Driving (AD) map.

FIG. 2 shows an exemplary segment of a pathway 200 in an Automatic Driving (AD) map. In AD maps, each point is specified using an Earth-Cantered, Earth-Fixed ("ECEF") coordinates system, where the point is uniquely identified by a longitude, a latitude and a height coordinate.

In addition, maps represent one or a plurality of pathways, like 200, wherein each pathway has a boundary, as for example 202 or 204, and a pathway boundary is defined by one or more lines 230 or 240, or more generally a polyline such as 230 or 240, connecting at least two map points 210 or 220 with each other. Since points are defined in 3 dimensions, pathways in AD maps are also represented in three dimensions including aspects such as up hills, and down hills.

Points that lay on the boundaries of pathways are denoted as shape points. Examples of shape points are points 210 and 220, where the shape points 210 lay along the left side of the pathways, and the points 220 lay along the right side of the pathway. Shape points 210 and 220 may correspond to a landmark on the map, or it may be any arbitrary point at the side of the pathway.

In some embodiments a pathway may be a road, in other embodiments a pathway is a lane in the road. Exemplary embodiments of pathways may include the passing lane on a large road, or other exemplary embodiments may include the right turning lane, or the left turning lane in an intersection, other exemplary embodiments may include the lane turning towards a given destination, or the exiting lane of a highway. In some embodiments, the pathway may be a road such as a highway, in other embodiments a street. In other embodiments, a pathway is any strip of land where a vehicle can drive through. In some embodiments, the pathway may not need to be based on land at all, in some embodiments a pathway may be a courses through water for floating vehicles or submerged vehicles, in other embodiments it may be a course through air for flying drones or other types of flying vehicles.

Some points in the map are particularly important because they either identify the position of landmarks, or because they are points that lay on the boundaries of roads and pathways. Examples of landmarks include road crossings, traffic signs, traffic lights, and in general objects that could be identified with a sensor such as the mono-camera monitoring the road.

Figure 3:
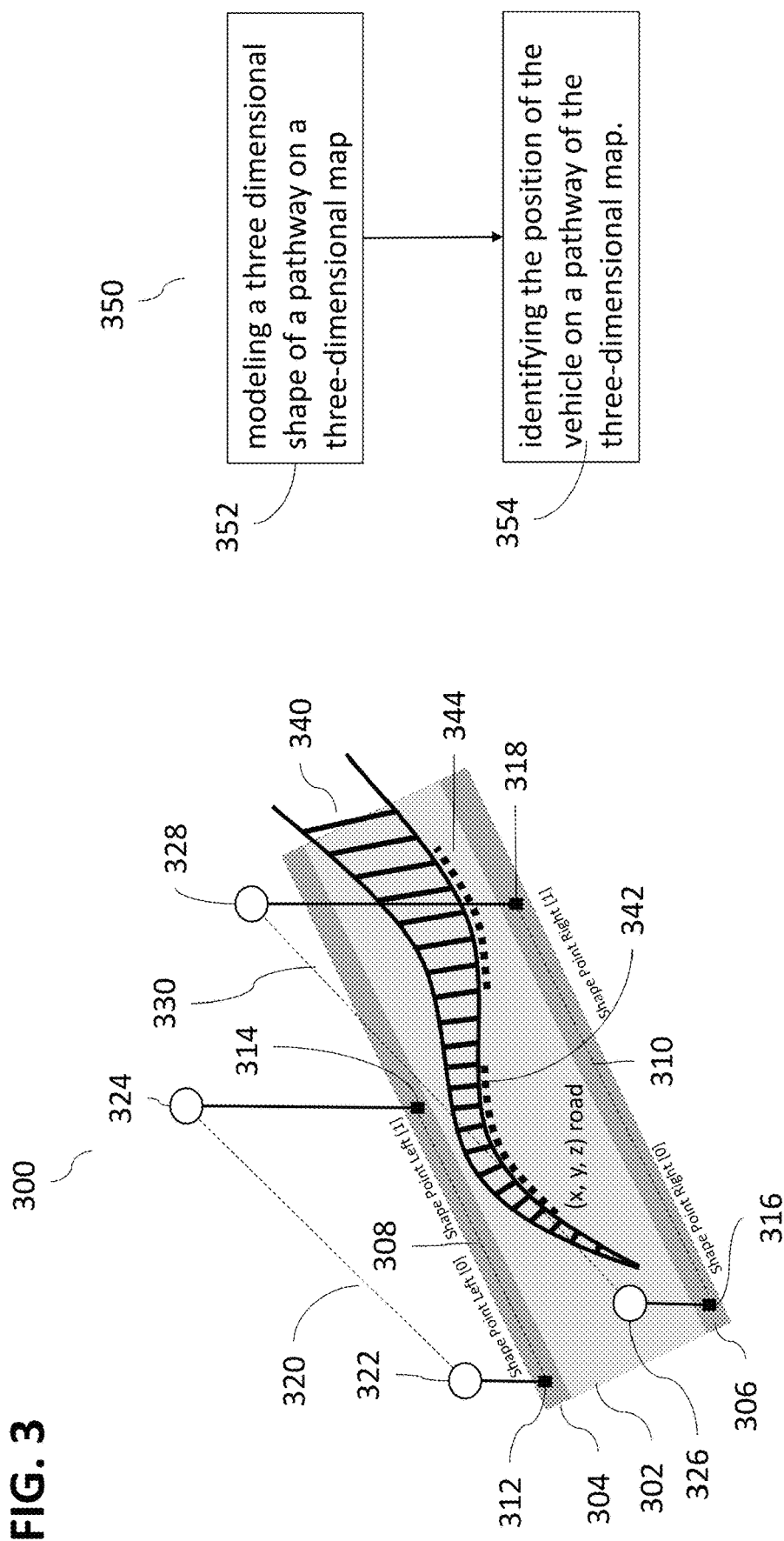
FIG. 3. shows a diagram with a pathway as well as its 3D curvature, and a block diagram representing a method to place a vehicle on a 3D map keeping into account the 3D curvature of the pathway.

FIG. 3. shows a diagram 300 with a pathway 302 as well as its 3D curvature 340, and a block diagram representing a method 350 to place a vehicle on a 3D map keeping into account the 3D curvature of the pathway. The diagram 300 shows the pathway 302, and the lane boundaries: 304 and 306. As in the case of FIG. 2, the lane boundaries are marked by a polyline. In FIG. 3, the polylines are only partially drawn as they are both composed of only one line, namely line 308, which is delimited by the two shape points 312 and 314, and line 310, that is delimited by the two shape points 316 and 318.

Whereas the pathway 302 and the boundaries 304 and 306 are illustrated on a flat surface, in reality they may represent a pathway which has a vertical curvature with uphill and downhill areas. An exemplary illustration of such vertical curvature is shown through sign 340, which illustrates the wavy structure of the pathway, where 342 and 344 are indicators of the vertical curvature of the pathway.

This vertical curvature is represented in the map through the height coordinate of the shape points. Specifically, the shape points 312, 314, 316, and 318 are 3D points which have a height dimension, such dimension is illustrated by the points 322, 324, 326, and 328.

The line 308 is to be thought as a sloping line in 3D, shown as line 320, between 322 and 324; similarly, the line 310 is to be thought as a sloping line in 3D as shown by the segment 330 between 326 and 328.

Shape points and landmarks have a position in a point in the 3D space, as in the case of point 324, and that lines and polylines, such as 320, have also a position in the 3D space. In perspective geometry lines and points are dual in the sense that they are represented in an equivalent way.

Given a 3D point x, as for example point 324, the 3D point to plane projection may be given by $$x' = PX \qquad (1)$$

where P is the projection matrix.

Similarly, the projection of a polyline $l=[l_1, l_2, l_3]^T$ to the same plane can be written as $$l' = (P^{-1})*L \qquad (2)$$

where P is the same projection matrix.

In an exemplary use of the formula (1), given a point X=(3,5,7), then the projections of point X are x'=3, y'=5, and z'=7. Similarly, in an exemplary use of formula (2), given s line L defined as 3*x+5*y+7=0, then the projection l' of L will be l'=[3,5,7].

The equation (2) is valid under the assumption of a plane to plane projection, in other words on a flat 2D plane. It should be observed that a road of any slope may be approximated by a plurality of flat projections in which the quality of the approximation depends on the size of the flat projections. Thus, many piece-wise projections of smaller size may lead to a better approximation than few large size piece-wise projections. Therefore, the autonomous vehicle may decide the best approximation on the bases of the information available, and the available computational resources.

Although equation (2) provides only an approximation of the 3D roads projections, it should be noticed that in practice, driving vehicles have a limited amount of sensors and the quality of the sensor information may vary on the bases of a number of factors. Therefore, when the number of measures is limited, the vehicle may anyway be forced to model a 3D space with a 2D model. As an alternative, other mathematical solutions for 3D projections may be provided, for example exploiting Plücker coordinates. In this context, it is to be noted that the use of a 2D model is very computationally efficient and requires less computational resources than e.g. the exploitation of Plücker coordinates.

Given the initial map 3D structure based on 3D shape points, it is possible to model the pathway curvature, as in the case of the curvatures 342 and 344, and starting from that the pathway smooth surface can be approximated as a clothoid.

A failure in taking into account the pathway curvature leads to the assumption that the pathway is flat and as a consequence to perception errors. The block diagram 350 shows a method to place a vehicle on a 3D map avoiding perception errors. The modelling the three dimensional shape of any pathway on a three-dimensional map in 352 consists in approximating the shape of the pathway using a clothoid function. Process 254 may include or essentially consist of identifying the position of the vehicle on a pathway of the three-dimensional map.

Starting from the motion model highlighted in FIG. 3, the modeling the three dimensional shape of a pathway on a three-dimensional map in 352 may involve approximating the shape of the pathway using a clothoid function. A clothoid function is characterized by the following parameter:

$$C = \frac{1}{R} \qquad (3)$$

where:
C is the clothoid curvature
R is the clothoid radius

Where the clothoid vertical radius is the radius of the vertical curvature of the pathway. An example of such curvature is provided by the signs 342 and 344 in FIG. 3.

Furthermore, clothoid curvature function is formed by the following formula:

$$C = C_{0vm} + C_{1vm}*L \qquad (4)$$

where
C is a measure of the curvature of the clothoid;
$C_{0vm}$ is the initial curvature of the clothoid;
$C_{1vm}$ is the rate of curvature change with respect to the measure of distance travelled by the vehicle;
L is a measure of distance travelled by the vehicle.

The following vehicle dynamics models have been chosen as a reduced model for the vertical plane. In this vehicle dynamics model, the functions to compute the initial curvature of the clothoid $C_{0vm}$ and the rate of clothoid curvature change with respect to the distance travelled by the vehicle $C_{1vm}$ are computed using the following formulae:

$$\dot{C}_{0vm} = C_{1vm}*v \qquad (5)$$

$$\dot{C}_{1vm} = \text{noise}(t) \qquad (6)$$

where
v is the velocity of the vehicle
noise(t) is a function that returns random values in a given time t Where the noise function is a function that produces random values within a given range. In some embodiments, the noise function is normally distributed with mean 0 and given standard deviation in other embodiments the noise function may follow other distributions. In some embodiments the standard deviation of the noise function may depend on the type of pathway; for example, highways may have a much smaller standard deviation than smaller roads. In various embodiments, the noise function may of course have a different functional structure and may depend on various parameters; therefore, the noise function should not be limited to a function having a normal distribution.

Figure 4:
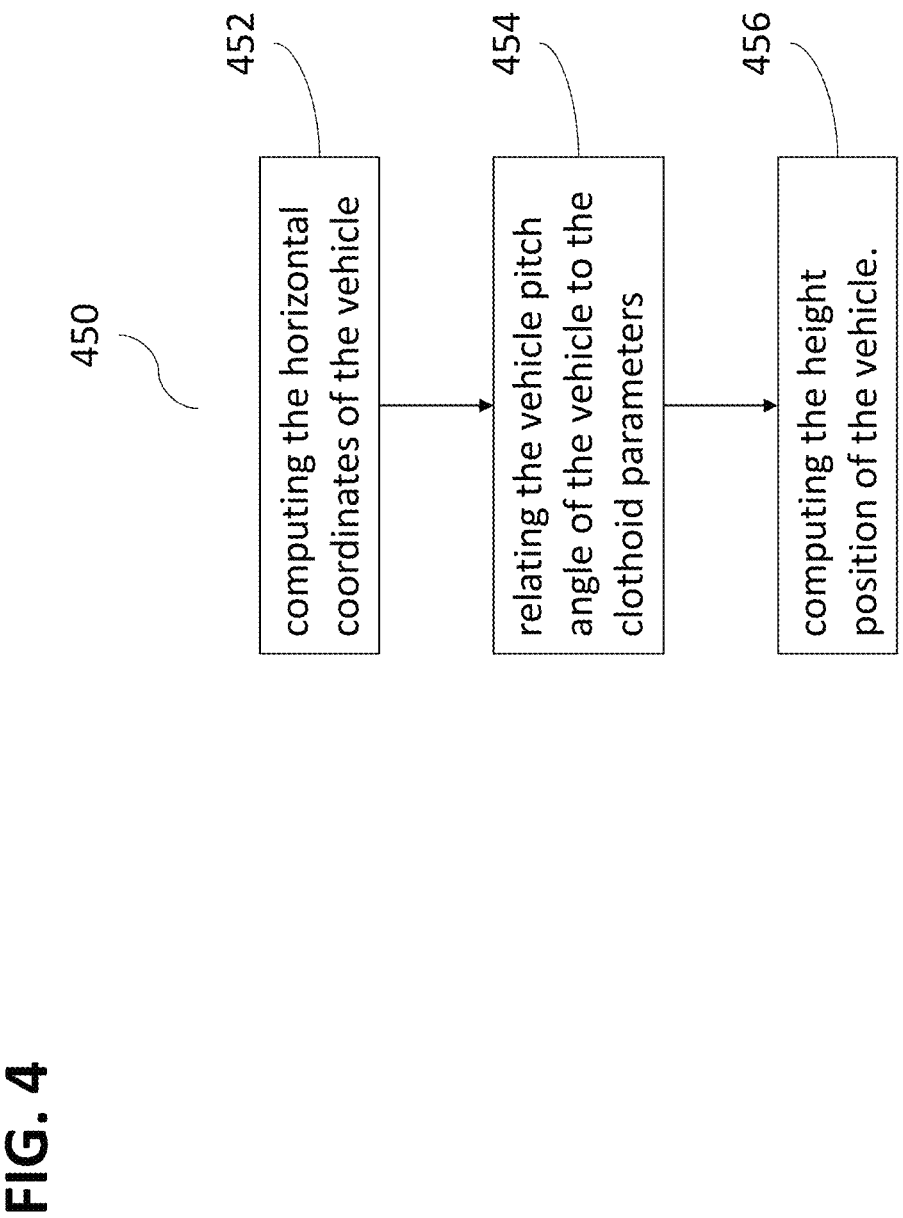
FIG. 4 shows a block diagram showing a method that may lead to a better assessment of the position of the vehicle in a 3D map.

FIG. 4 shows a block diagram 450 showing a method that may lead to a better assessment of the position of the vehicle in a 3D map.

Once the modeling the three dimensional shape of a pathway on a three-dimensional map is complete, the next process in 350 is to identifying the position of the vehicle on a pathway. This process, which is highlighted in the diagram 450, includes process 452 for computing the horizontal coordinates of the vehicle; process 454 for relating the vehicle pitch angle of the vehicle to the clothoid parameters; and process 456 for computing the height position of the vehicle.

Figure 5:
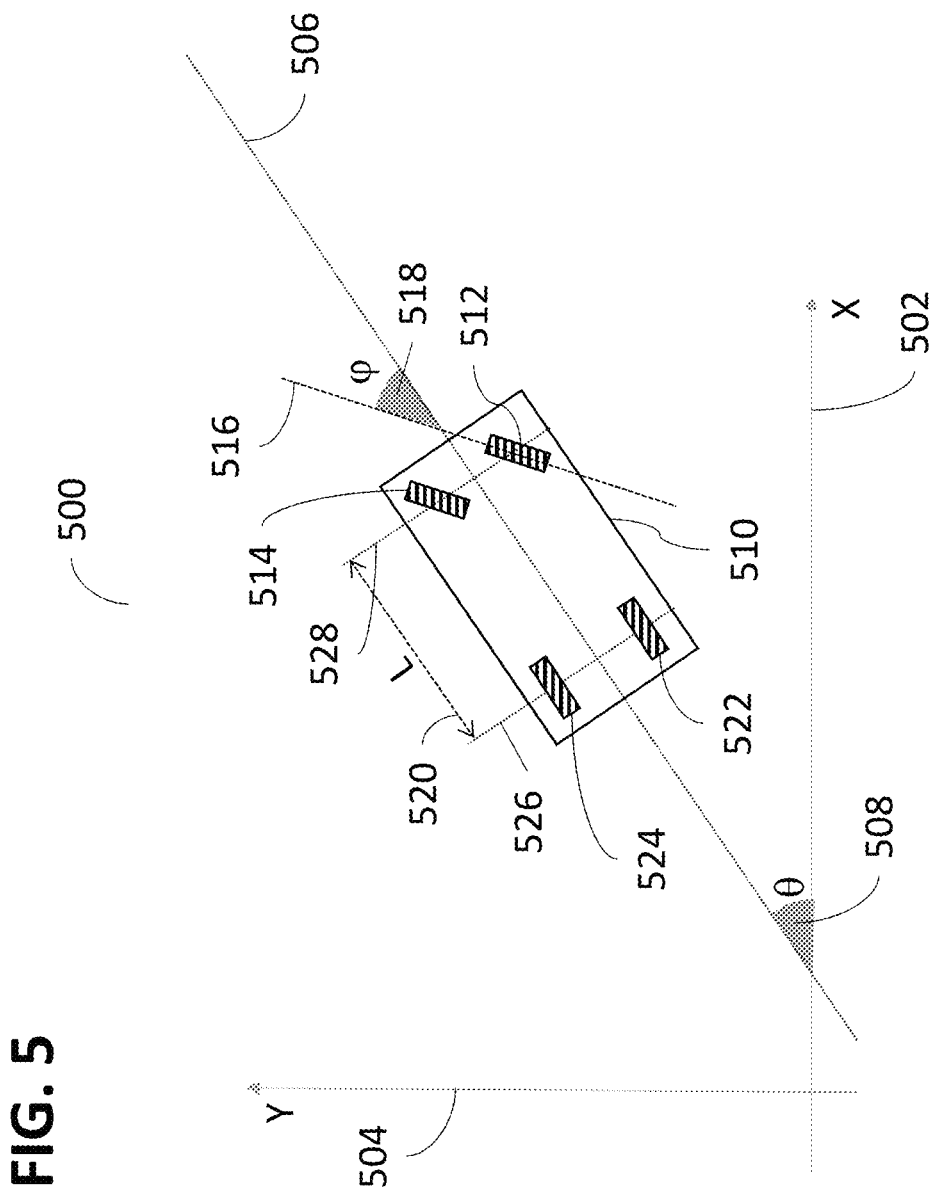
FIG. 5 shows a diagram with the main geometric components that are required for computing the horizontal coordinates of the vehicle.

FIG. 5 shows a diagram 500 with the main geometric components that are required for computing the horizontal coordinates of the vehicle in process 452 of diagram 450 in FIG. 4. The computation of the horizontal coordinates of the vehicle is based on the so called car-bicycle model assumption. The car-bicycle model is a simplifying assumption of the motion of a vehicle in which it is assumed that the angle of the two front driving wheels respect to the driving direction is the same. Even though the car-bicycle assumption does not hold in real vehicles, the advantage of the car-bicycle model is to simplify the mathematics at the cost of a minimal negligible error.

In addition, the lateral movements of the vehicle are assumed to be on a flat area with no vertical curvature. In other words, there is a mathematical assumption that the pathway is flat around the vehicle, and that it moves "stepwise" progressively up or down as the vehicle drives.

Although the car-bicycle model refers to cars, it is clear that it is not limited to cars but it extends to all wheeled vehicles with two or more steering wheels. To this extent, the car-bicycle model applies also to trucks, tractors, robots, wheeled drones, tricycles with two front steering wheels. In FIG. 5, the rectangle 510 represents the borders of an exemplary vehicle with four wheels 512, 514, 522 and 524. The lines 502 and 504 represent the axis of the plain on which the vehicle is driving. Specifically, 502 represents the X axis and the 506 the Y axis.

The line 506 represents the instantaneous driving headings, in other words the direction, of the vehicle 510. The driving direction 506 is instantaneous because due to the inclination of the wheels 512 and 514 the vehicle is changing direction.

The angle 508, denoted as θ, represents the vehicle heading angle with respect to the X axis.

The line 516 indicates the steering direction of the right wheel 512, while the steering angle, sometime referred to as yaw angle, 518 is denoted as φ. Since there is an underlying car-bicycle model assumption, the two wheels 512 and 514 are always parallel, and therefore they have the same steering direction and steering angle.

The vehicle wheels are centred on their rotation axes. The line 528 indicates the position of the front rotation axis crossing the two front wheels 512 and 514, while the line 526 indicates the position of the back rotation axis crossing the two wheels 522 and 524.

The distance between the two rotation axes is indicated with 520 and such distance is mathematically represented as L.

Under the car-bicycle model, the dynamic equations for computing the horizontal coordinates of the vehicle includes applying the following formulae:

$$\dot{x} = v * \cos(\theta) \tag{7}$$

$$\dot{y} = v * \sin(\theta) \tag{8}$$

$$\dot{\theta} = \frac{v}{L} * \tan(\varphi) \tag{9}$$

where:
x and y are coordinates;
φ is the steering wheel angle;
θ is the vehicle heading angle;
L is the length between the vehicle axes;
The dot on top of the signs indicates a changing rate of the corresponding value.

Figure 6:
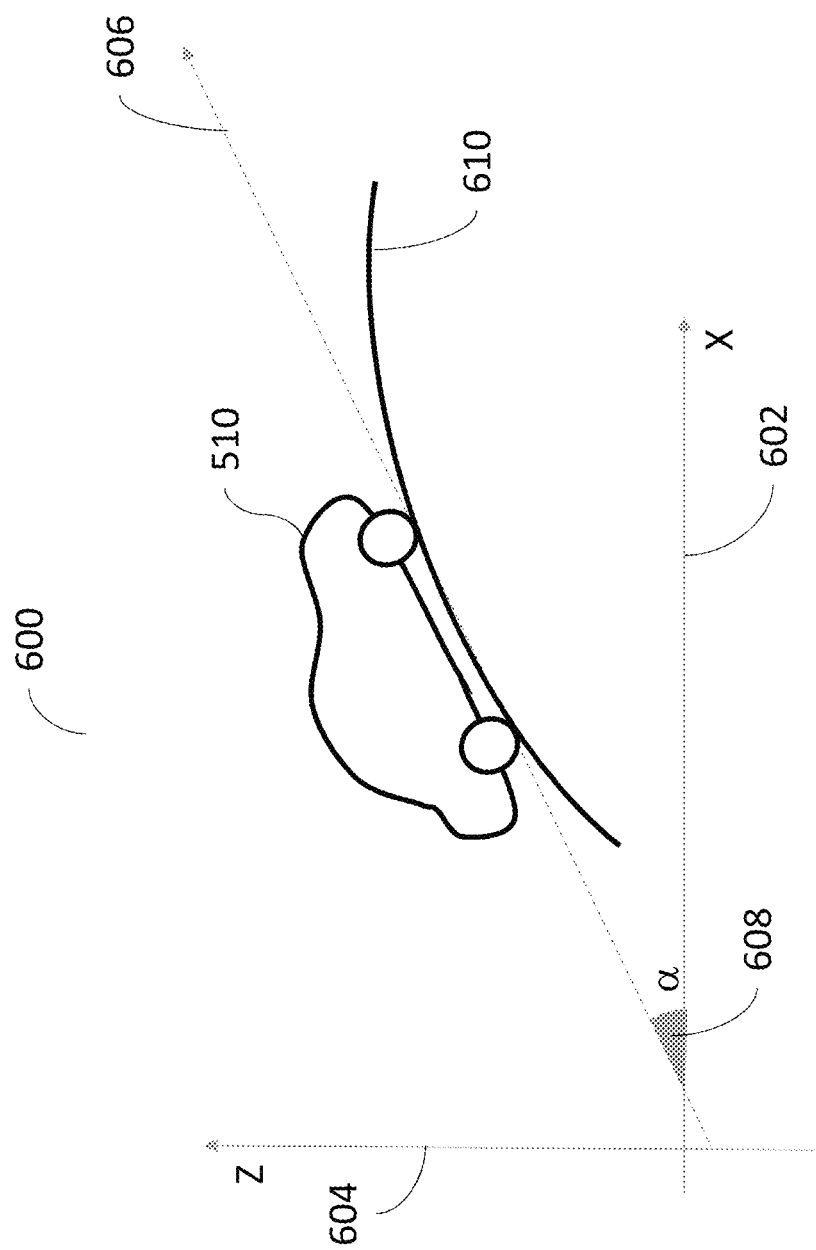
FIG. 6 displays a diagram showing the main geometric components required for relating the pitch angle of the vehicle to the clothoid parameters.

FIG. 6 displays a diagram 600 showing the main geometric components required for relating the pitch angle of the vehicle to the clothoid parameters. In FIG. 6, the line 602 represents the X axis of the plane of the ground map, while 604 is the Z axis representing the height dimension over the ground plane. A third Y axis that defines the second horizontal dimension of the plane of the ground map is perpendicular to FIG. 6 and it is not displayed. The line 610 represents the 3D surface on which the vehicle 510 is driving. The surface represented by 610 is modelled with a clothoid with parameters $C_{0vm}$ and $C_{1vm}$. The line 606 represent the instantaneous driving plane of the vehicle 510, which is tangent to the surface 610. The driving plane is instantaneous because as the vehicle drives, the plane changes and therefore the slope of line 606 also changes. The line 606 intersects the X axis 602 forming angle α, 608. The angle α, 608, is sometime referred to as pitch angle or slope angle.

The process of relating relating the pitch angle α, 608 of the vehicle to the clothoid parameters comprises applying the following formula:

$$\dot{\alpha} = C_{0vm} * v \tag{10}$$

where:
α is the vehicle pitch angle;
v is the vehicle velocity;
$C_{0vm}$ is a clothoid parameter;
The motion parameters can be derived from odometry measurements that can be done on the vehicle using the Inertial Measurement Unit (IMU) which includes sensors such as accelerometers, gyroscopes, and magnetometers.

Specifically, odometry related measurements are:
v: velocity
θ: Steering angle change, which can be derived using the IMU
α: slope angle change, which can be derived using the IMU
accelerations in x, y, z direction, which can be derived using the IMU
X, Y, Z position, which can be derived using a positioning sensor such as the GPS In addition, other sensors, such as Lidar sensors and cameras, can be used to derive more information about the pathway and landmarks.

More specifically,
for Lane markings—mono camera and/or lidar may be used;

for Land markings—mono camera and/or radar and/or lidar may be used.

In some embodiments the lane marking may be detected through image processing of images taken by the mono-camera. In these embodiments the image processing of a picture may for example recognize the different types of road surface markings and recognize how the road progress forward. For example, the road surface marking may indicate whether the road is continuing straight ahead until the horizon, or it is turning left or right. The road sign marking may also indicate whether the road changes inclination towards an uphill or a downhill, or whether the road will stay flat for a while and then change inclination.

In some embodiment the visual analysis of the road surface marking may be performed at different fix look-ahead distances $d_1, d_2, \ldots, d_i$, in front of the vehicle so that the vehicle may have a projection of the changes on the road at different distances.

In some embodiments, the road surface marking analysis may be performed using a Lidar image instead of a mono-camera image, to the extent that a signal about the road surface marking can be detected by the Lidar.

Figure 7:
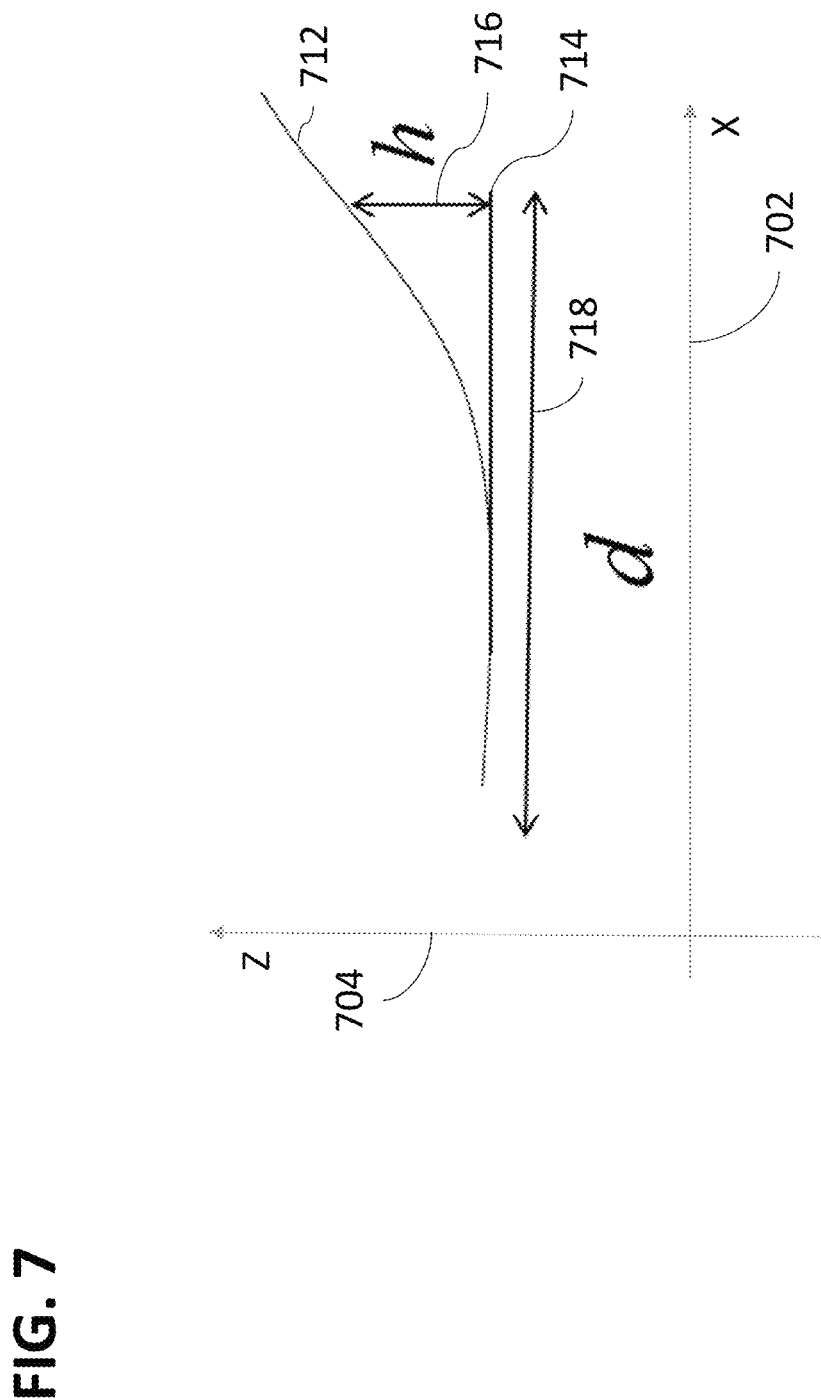
FIG. 7 shows the geometry of the calculation of the height parameter to compute the vertical positioning of a vehicle.

FIG. 7 shows the geometry of the calculation of the height parameter to compute the vertical positioning of a vehicle. FIG. 7 is shown in same coordinate system of FIG. 6, in FIG. 7 line 702 represents the X axis of the plane of the ground map, while line 704 is the Z axis representing the height dimension over the ground plane. A third Y axis that defines the second horizontal dimension of the plane of the ground map is perpendicular to FIG. 7 and it is not displayed. Line 712 represents a cross section of a surface on which a vehicle could be driving. In the map, line 712 may represent a clothoid function with parameters $C_{0vm}$ and $C_{1vm}$. Line 714 represents the map plane. The distance 718, denoted as d, represents a fix look-ahead distance. The line 716, denoted as h, represents the estimated height of surface with cross section 712, Given the value d, computing the height position of the vehicle, as specified in process 456 of block diagram 450 in FIG. 4, includes applying the following formula:

$$h = \frac{C_{0vm}}{2} * d^2 + \frac{C_{1vm}}{6} * d^3 \quad (11)$$

where:
$C_{0vm}$ and $C_{1vm}$ are the clothoid parameters;
d is the look-ahead distance;
h is the estimated height on the road.

Figure 8:
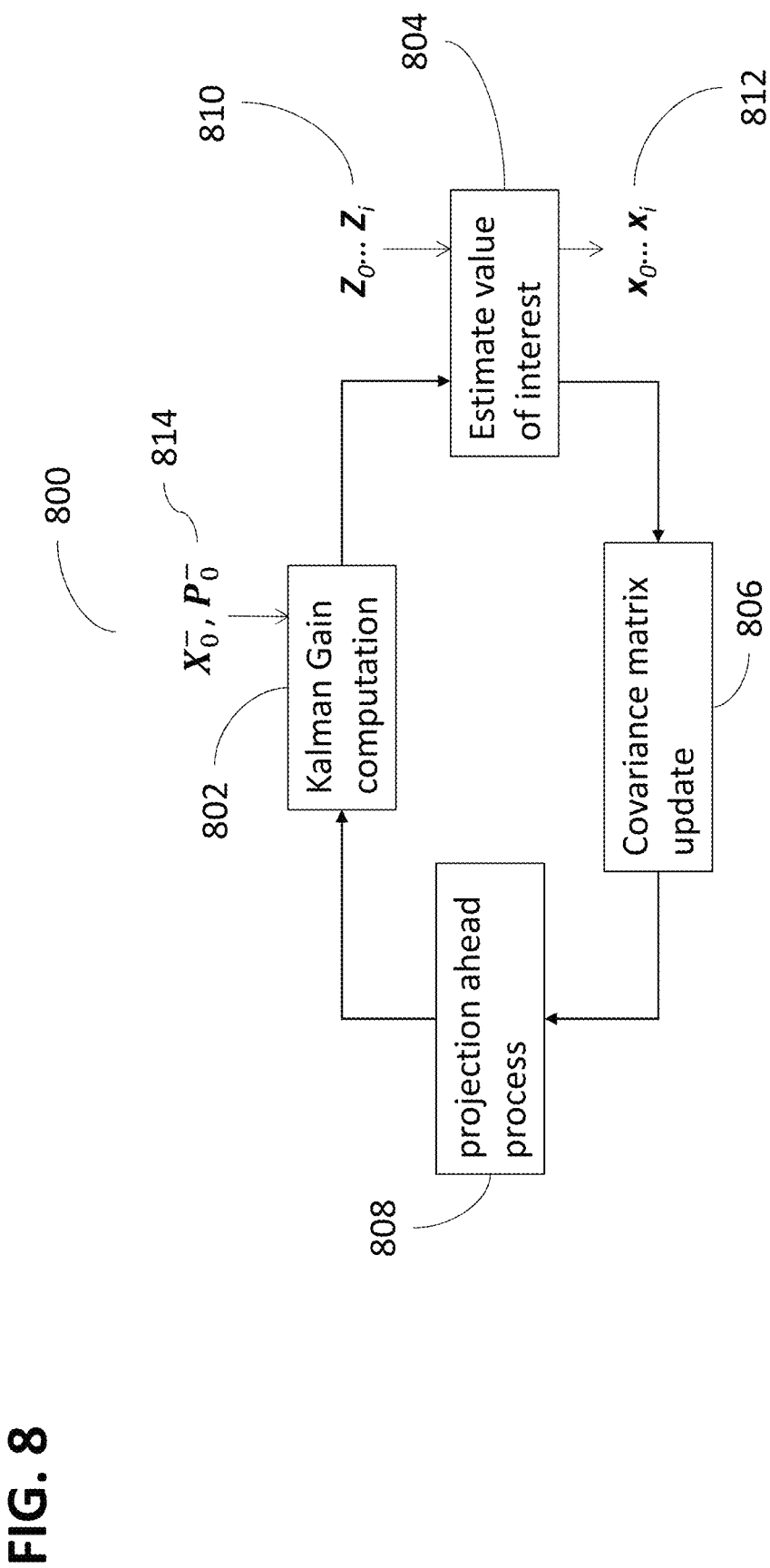
FIG. 8 shows an embodiment of the Kalman filter.

FIG. 8 shows an embodiment 800 of the Kalman filter. The embodied Kalman filter provides estimates of some unknown variables $X_t$, typically representing the internal state of a device, starting from repeated noisy measurements $Z_t$ collected over time. Examples of values of $X_t$ may be the correct position of the vehicle or the curvature parameters of the clothoid approximating the curvature of the pathway. Examples of $Z_t$ may be GPS position coordinates, or measurements performed on Lidar or mono-camera pictures, or any other reading coming from the sensors on board the vehicle.

The core of the Kalman filter is to implement a feedback loop in which the estimate provided at a given iteration k is compared with the measurements performed at iteration k+1 to evaluate the error of the estimate. In turn, the error estimate is used to improve the derivation process and progressively reduce the error. As a consequence, the Kalman filter may progressively converge to predictions that progressively reduces the error of the projection to arrive at good estimates of the unknown variable $X_k$. The mathematical conditions under which the Kalman filter converges to correct values are well known in the state of the art and the person skilled in the art either knows them, or can easily find publications and books explaining such conditions. Similarly, the different types of Kalman filters and their mathematical assumptions are well known in the state of the art; as it is well known how to trigger the Kalman filter feedback loop, and how to compute the required priors and all the required values.

Since the Kalman filter is computed by an infinite feedback loop, there is no natural starting point and end point for the description of FIG. 8. The following, description starts from process 804 where measurements 810 are transformed in an initial estimate 812, followed by the process 806 where the error is computed, followed by the process 808 where a new projection is provided, followed by process 802 where the Kalman gain is computed; with the completion of process 802 the feedback loop is closed by returning to step 804.

In 804 of the Kalman filter, given some stochastically noisy measurements $Z_0, Z_1$ 810 collected during the iterations k=0 and k=1, produces some estimates 812 of values of interest $X_0, X_1$ corresponding to the values at iterations k=0 and k=1. The estimate is computed with the following formula:

$$\hat{X}_k = \hat{X}_k^- + K_k*(z_k - H_k*\hat{X}_k^-) \quad (12)$$

where:
k is the index of the iterations;
$\hat{X}_k$ is the estimate of the variable of interest at iteration k;
$\hat{X}_k^-$ is the prior estimate of the variable of interest at iteration k;
$K_k$ is the Kalman gain;
$z_k$ is the measurement at iteration k;
$H_k$ is the observational model at iteration k.

In 806, an error covariance matrix $P_k$ for the updated estimate is computed. The error covariance matrix $P_k$ is computed with the following formula:

$$P_k = (I - K_k*H_k)*P_k^- \quad (13)$$

where:
k is the index of the iterations, in other word;
$P_k$ is the error covariance matrix at the iteration k;
I is identity matrix;
$K_k$ is Kalman gains;
$H_k$ is the observational model at iteration k;
$P_k^-$ is the prior the error covariance matrix at the iteration k.

808 is a projection ahead process in which a new prior $\hat{X}_{k+1}^-$ of the variable in interest is computed and a new prior $P_{k+1}^-$ of the error covariance matrix is computed. The projection is computed with the following formulae:

$$\hat{X}_{k+1}^- = \varphi_k*\hat{X}_k$$

$$P_{k+1}^- = \varphi_k*P_k*\varphi_k^T + Q_k \quad (14)$$

where
$\hat{X}_{k+1}^-$ is the prior estimate of the variable of interest at iteration k+1;
$X_k^-$ is the prior estimate of the variable of interest at iteration k;
$\varphi_k$ is state transition matrix;
$P_{k+1}^-$ is the prior the error covariance matrix at the iteration k+1;

$P_k^-$ is the prior the error covariance matrix at the iteration k;

$Q_k$ is process covariance matrix.

In 802, the so called "Kalman gain" $K_i$ is computed, where the Kalman gain provides a measure of the trust in the measurements versus the trust in the estimation.

Process 802 is triggered using inputs 814, namely $X_0^-$ which is an estimate of the prior of the vector $X_0$ and $P_0^-$ which are estimates of the covariance matrix $P_0$. The person skilled in the art either knows how to compute these estimates or can find information on how to do it.

The Kalman gain in 802 is computed using the following formula:

$$K_k = P_k^- * H_k^T * (H_k * P_k^- * H_k^T + R_k)^{-1} \quad (15)$$

where $K_k$ is the Kalman gain at iteration k;

$P_k^-$ is the prior the error covariance matrix at the iteration k;

$H_k^T$ is the translated matrix of the observational model at iteration k;

$H_k$ is the observational model at iteration k;

$R_k$ is measurement error covariance matrix.

The embodiment of the Kalman filter 800 may be any type of Kalman filter depending on the characteristics of the data provided, in some embodiments it may be an extended Kalman filter, in others it may be an Unscented Kalman filter, and in other embodiments it may be any one of the various variation on the Kalman filter.

Figure 9:
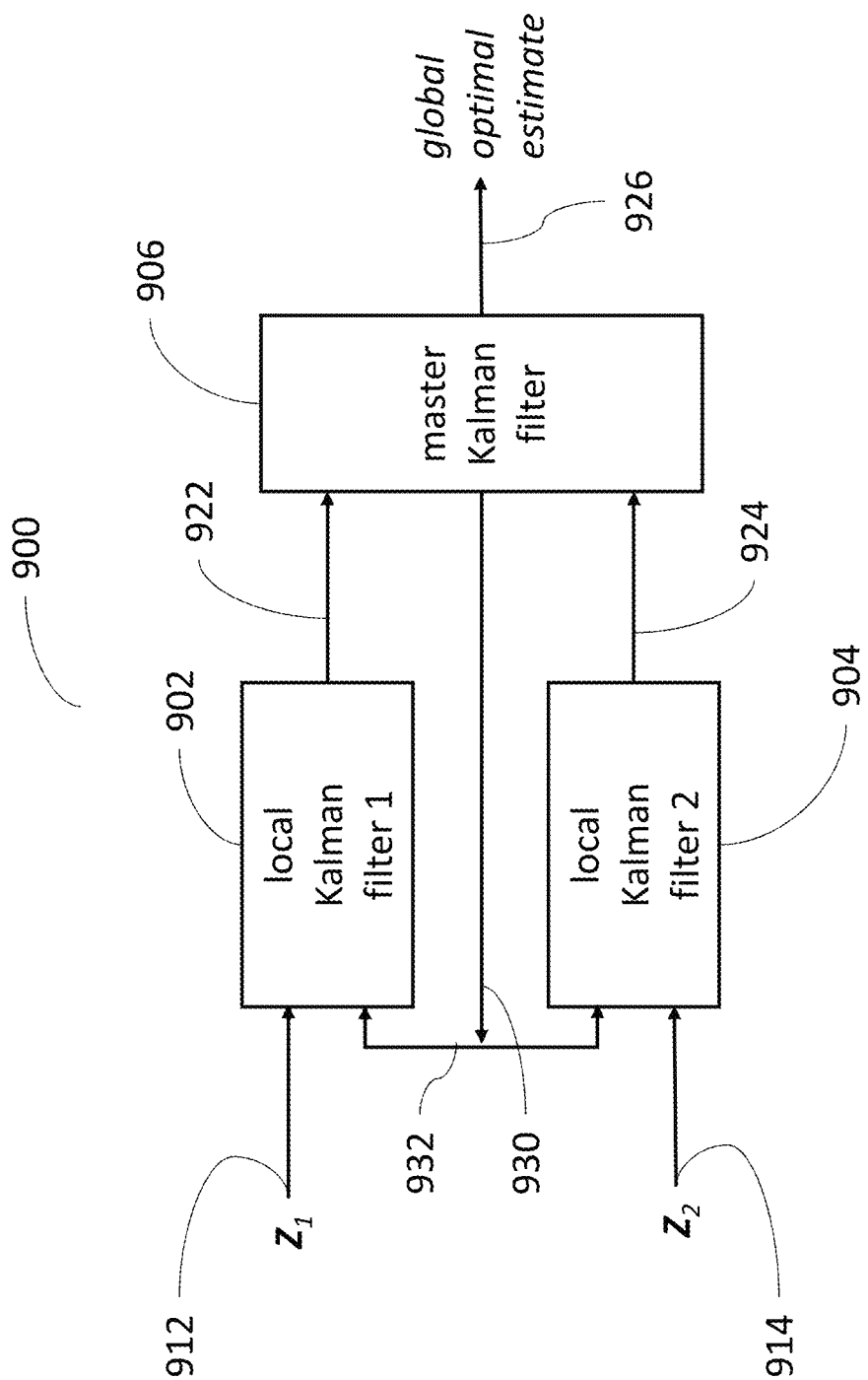
FIG. 9 shows an embodiment of the distributed Kalman filter.

FIG. 9 shows an embodiment 900 of the distributed Kalman filter may include a plurality of local Kalman filters of which 902 and 904 are two examples, and a master Kalman filter 906 configured to be coupled to the plurality of local Kalman filters. The local Kalman filters 902, 904, as well as the master Kalman filter 906 may be running on the same processor or on a plurality of processors, wherein the one or more processors are configured to: apply the individual sensor information about a three-dimensional position of the vehicle to the distributed Kalman filter through the connectors 912 and 914. Each local Kalman filter 902 and 904, may process the individual sensor information received from an associated sensor of the plurality of sensors; then transfer the results of their processes to the master Kalman filter through connectors 922 and 924. The information transfer from the local Kalman filters, to the master system may depend on the sensors which operates asynchronously, therefore the master Kalman filter may process the results provided by at least some of the local Kalman filters. A portion of the output of the master Kalman filter including an estimate m of state conditioned on the sensor information and a covariance matrix M associated with the estimate of state conditioned on the sensor information, is transferred to the local Kalman filters through connectors 930 and 932. The local Kalman filters 902, 904 then use m and M for auto-correction to improve their next predictions.

More specifically, the local Kalman filter 902 satisfies the equations $$x_1 = P_1 * (M^{-1} * m + H_1^T * R_1^{-1} * z_1)$$

$$P_1^{-1} = M^{-1} + H_1^T * R_1^{-1} * H_1 \quad (16)$$

where $\hat{x}_1$ is the first local Kalman filter estimate of state conditioned on the sensor information received by the local Kalman filter from an associated sensor of the plurality of sensors;

$P_1$ is the error covariance matrix of the first local Kalman filter;

m is the master Kalman filter estimate of state conditioned using all sensor information;

M is a covariance matrix associated with m: the master Kalman filter estimate of state conditioned using all sensor information;

$H_1$ is the observational model of the first local Kalman filter;

$R_1$ is the covariance matrix of the observational model of the first local Kalman filter;

$z_1$ is the sensor information received by the first local Kalman filter from an associated sensor of the plurality of sensors.

The local Kalman filter 904 satisfies the equations $$x_2 = P_2 * (M^{-1} * m + H_2^T * R_2^{-1} * z_2)$$

$$P_2^{-1} = M^{-1} + H_2^T * R_2^{-1} * H_2 \quad (17)$$

where $\hat{x}_2$ is the second local Kalman filter estimate of state conditioned on the sensor information received by the local Kalman filter from an associated sensor of the plurality of sensors;

$P_2$ is the error covariance matrix of the second local Kalman filter;

m is the master Kalman filter estimate of state conditioned using all sensor information;

M is a covariance matrix associated with m: the master Kalman filter estimate of state conditioned using all sensor information;

$H_2$ is the observational model of the second local Kalman filter;

$R_2$ is the covariance matrix of the observational model of the second local Kalman filter;

$z_2$ is the input measurement of the second local Kalman filter.

The master Kalman filter 906 satisfies the equations $$\hat{x} = P * [P_1^{-1} * \hat{x}_1 + P_2^{-1} * \hat{x}_2 + M^{-1} * m]$$

$$P^{-1} = P_1^{-1} + P_2^{-1} - M^{-1} \quad (18)$$

where $\hat{x}$ is the master Kalman filter estimate of state conditioned on the sensor information received by all local Kalman filters from all associated sensors of the plurality of sensors;

$\hat{x}_1$ is the first local Kalman filter estimate of state conditioned on the sensor information received by the first local Kalman filter from an associated sensor of the plurality of sensors;

$\hat{x}_2$ is the second local Kalman filter estimate of state conditioned on the sensor information received by the second local Kalman filter from an associated sensor of the plurality of sensors;

P is the error covariance matrix of the master Kalman filter;

$P_1$ is the error covariance matrix of the first local Kalman filter;

$P_2$ is the error covariance matrix of the second local Kalman filter;

m is an optimal estimate of state conditioned using all measurements;

M is a covariance matrix M associated with m;

After each iteration the new estimates of m and M will be based on z and P as specified by the formulae below.

$$m = \hat{x}$$

$$M = P \quad (19)$$

The embodiment 900 differs from the embodiment 800 in that, whereas in 800 all unknown variables are estimated by the same Kalman filter, in 900 the estimates of the unknown variables are performed by different local Kalman filters such as 902 and 904 each of which is functionally equivalent to the embodiment of the Kalman filter 800. The local Kalman filters take as input the measurements $Z_k$ with 912 and 914, and generate estimated values $\hat{x}_k$ and the error covariance matrix $P_k^{-1}$. In turn $\hat{x}_k$ and $P_k^{-1}$ are shared through the connectors 922 and 924 with a master Kalman filter 906 to generate an optimal estimate 926. In turn the feedback loop is implemented by feeding back an optimal estimate of state m conditioned using both measurements, and a covariance matrix M associated with m through the connectors 930 and 932.

It is to be understood that the configuration of the local Kalman filters and of the master Kalman filter depends on the types of sensors that are used and on the characteristics of these sensors outputs. These are known to the person skilled in the art implementing the system; in addition information on how to configure a Kalman filter is widely available.

From the engineering standpoint, the difference between the distributed Kalman filter in FIG. 9 and the Kalman filter in FIG. 8 is that the distributed Kalman filter can be reconfigured with much higher ease. For example, when a new sensor is added to the system, a new local Kalman filter may be configured, but the other local Kalman filters are not impacted, and the impact on the master filter may be quite limited. The same cannot be said of the Kalman filter 800, since the addition of a new sensor may require considerable changes in the internal representations of the system. From the engineering point of view, the advantage of the distributed Kalman filter is therefore much higher flexibility.

An additional engineering advantage is increased reliability, since even when the some of the local filters and sensors may be damaged, the whole system may continue functioning and report appropriate evaluations of the state, even though these evaluations may have some quality degradation due to the availability of less information.

Figure 10:
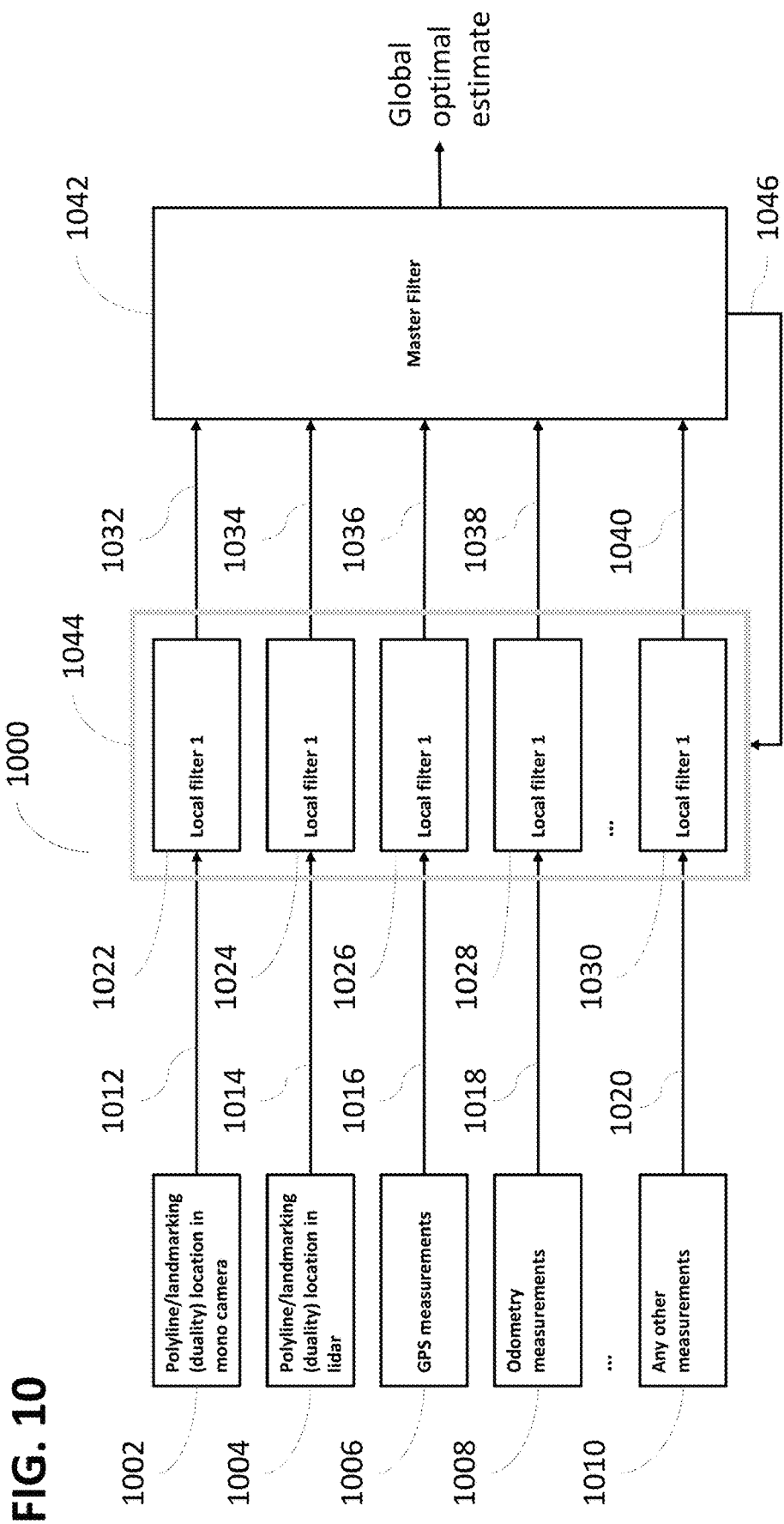
FIG. 10 shows an embodiment of the of a localization system for 3D location for Autonomous Driving.

FIG. 10 shows an embodiment 1000 of the of a localization system for 3D location for AD. The embodiment 1000 is based on the decentralized Kalman filter that is shown in 900.

The components 1002, 1004, 1006, 1008, 1010 are embodiments of sensors that collect information about the vehicle and the environment in which the vehicle moves. Each one of the components 1002, 1004, 1006, 1008, 1010 provide individual sensor information about a three-dimensional position of the vehicle.

The component 1002 may be an embodiment of a sensor that provides individual sensor information about a three-dimensional position of the vehicle further includes a mono-camera picture sensing at least one of: landmarks; physical pathway boundaries; or physical pathway slope. The component 1002 may provide visual recognition of the polylines and of the landmarks. In some embodiments, it may perform an analysis consistent formula (11).

Component 1004 may be an embodiment of a sensor that that provides individual sensor information about a three-dimensional position of the vehicle further includes a Lidar sensing at least one of: landmarks; physical pathway boundaries; or physical pathway slope. Component 1004 may also provide visual recognition of the polylines and of the landmarks. In some embodiment component 1004 may also perform visual recognition of objects and lines and it may also perform an analysis consistent formula (11).

Component 1006 may be an embodiment of a position sensor that provides individual sensor information about a three dimensional positioning information using a positioning system. In some embodiments the positioning system may include the Global Positioning System (GPS), or the Differential GPS or the Galileo Positioning System, or the Global Navigation Satellite System (GLONASS), or the Beidou System. In other embodiments the positioning system may include positioning based on cellular technology or on ad-hoc beacons positioned in a given environment, or an indoor positioning system or any other positioning technology.

Component 1008 may be an embodiment of a sensor which provides individual sensor information about a three-dimensional position of the vehicle including at least one type of odometric information coming from the Inertial Measurement Unit of the vehicle. Odometric information includes at least one of vehicle velocity, vehicle yaw angle change, vehicle pitch angle change, vehicle acceleration in x, y, z direction, and vehicle position. Furthermore, component 1008 may implement a visual odometry system wherein the odometric information further comprises visual information from one or a plurality of mono-camera sensor or one of a plurality of Lidar sensors. Visual odometry augments the IMU estimates using pictures taken from the mono-camera or from a stereo camera, and in other embodiments it may include other measurements based on sensors such as Radar and Lidar. Component 1008 may perform estimates described in the formulae (7), (8) and (9).

Component 1010 may be an embodiment of any other sensor that may provide information that is relevant to the positioning of the vehicle. Examples of such information may include lane detection, information relative to other vehicles that are close to the vehicle, obstacle detection.

The components 1022, 1024, 1026, 1028, 1030 are embodiments of local Kalman filters that are functionally equivalent to the local Kalman filters 902 and 904 and that satisfy equations equivalent to formulae (16) and (17) with the variable indexes appropriately adjusted as shown in formulae (20); where the adjustment of variable indexes in the formulae (16) and (17) can for example be done in the following way: given that in a system there are n local Kalman filters enumerated as $f_1, \ldots f_n$, the formulae controlling the i-th filter should satisfy the following formulae:

$$\hat{x}_i = P_i * (M^{-1}*m + H_i^T * R_i^{-1} * z_i) \quad (20)$$

$$P_i^{-1} = M^{-1} + H_i^T * R_i^T * H_i$$

where
i is the index of the local Kalman filter
$\hat{x}_i$ is the estimated value of the ith local Kalman filter;
$P_i$ is the error covariance matrix of the i-th local Kalman filter;
M is a covariance matrix M associated with m;
m is an optimal estimate of state conditioned using all measurements;
$H_i$ is the observational model of the i-th local Kalman filter;
$R_i$ is the covariance matrix of the observational model of the i-th local Kalman filter:
$z_i$ is the input measurement of the i-th local Kalman filter.

Formulae (20) are an obvious generalization of formulae (16) and (17). Whereas formulae (16) and (17) are specific for filters with indexes 1, (16) and 2, (17), formula (20) generalizes to any local Kalman filter with any index.

For example, in the case of the system in FIG. 10, n is equal to 5, and i may indicate one of the local Kalman filters embodied in the components 1022, 1024, 1026, 1028, 1030.

In some embodiments, the local Kalman filters 1022, 1024, 1026, 1028, 1030 are in a one to one relation with the sensors in the sense that there is one local Kalman filter for each sensor; in other embodiments local Kalman filters may be connected to multiple sensors that are unrelated to each other, in other embodiments the sensors may gather different types of information that may be distributed across multiple local sensors.

In the embodiment displayed in FIG. 10, sensor 1002 is connected to the local Kalman filter 1022 through the connector 1012, sensor 1004 is connected to the local Kalman filter 1024 through the connector 1014, sensor 1006 is connected to the local Kalman filter 1026 through the connector 1016, sensor 1108 is connected to the local Kalman filter 1028 through the connector 1018, sensor 1010 is connected to the local Kalman filter 1030 through the connector 1020. The connectors 1012, 1014, 1016, 1018, 1020 transmit measurements information $z_k$ where k is the index of a sensor.

The component 1042 may be an embodiment of a master Kalman filter, which may be functionally equivalent 906 and that may satisfy equations that are equivalent to equations (18) with the indexes appropriately corrected as in equation (21) below. The component 1042 may receive inputs through connectors 1032, 1034, 1036, 1038, 1040 from the embodiments of local Kalman filters 1022, 1024, 1026, 1028, 1030 and it computes a Global optimal estimate of the location of the vehicle.

Specifically, applying the master Kalman filter 1042 to the results provided by at least some of the local Kalman filters comprises applying the master Kalman filter using the following formulae:

$$\hat{x} = P\left[\sum_{i=1}^{n}(P_i^{-1} * \hat{x}_i) - M^{-1} * m\right] \quad (21)$$

$$P^{-1} = \left(\sum_{i=1}^{n} P_i^{-1}\right) - M^{-1}$$

where m is an optimal estimate of state conditioned using all measurements;

M is a covariance matrix associated with m;

$P_i$ is the error covariance matrix of the i-th local Kalman filter;

$\hat{x}_i$ is the estimated value of the i-th local Kalman filters;

P is the error covariance matrix of the master Kalman filter;

$\hat{x}$ is the estimated value of the master Kalman filter.

Formulae (21) are an obvious generalization of formulae (18). Whereas in formulae (18) were limited to a system with two local Kalman filters, formulae (21) generalize to any number of local Kalman filters. Therefore the sum $P_1^{-1}+P_2^{-1}$ which was used in formula (18) generalizes to the unbounded sum (22)

$$\sum_{i=1}^{n}(P_i^{-1}) \quad (22)$$

Connectors 1032, 1034, 1036, 1038, 1040 transmit information about the estimated values $\hat{x}_i$ and the error covariance matrix $P_i^{-1}$ where i is an index ranging over the local Kalman filters.

Component 1042 is connected to the embodiments of local Kalman filters 1022, 1024, 1026, 1028, 1030 through the connectors 1046 and 1044, where connector 1046 indicates the output of 1042, and 1044 is a box indicating a distribution of information to the components 1022, 1024, 1026, 1028, 1030 and it is used here only to avoid over-complicating the figure. The connectors 1046 and 1044 are analogous to the connectors 930 and 932 and they transmit an optimal estimate of state m conditioned on all measurements, and a covariance matrix M associated with m.

By collecting all estimated values $\hat{x}_i$ from the embodiments of the local Kalman filters 1022, 1024, 1026, 1028, 1030 and reporting the Global optimal estimate of the location of the vehicle in 3D AD maps, the master Kalman filter 1042 essentially performs an information fusion task in which the master Kalman filter acts as error reducer by providing an estimate of the position of the vehicle that is better than the estimate that is produced by the single sensors or by the single local Kalman filters, and as error estimator by computing the error covariance Matrix M.

In the following, various examples are provided with reference to the aspects described above.

Example 1 is a method for sensing the position of a vehicle on a three-dimensional map, where the method may comprise receiving, from one or more sensors, sensor information about a three-dimensional position of the vehicle; and applying a distributed Kalman filter to the sensor information to determine the position of the vehicle on the three-dimensional map.

In Example 2. the subject matter of Example 1 may optionally include that the distributed Kalman filter may include a plurality of local Kalman filters and a master Kalman filter coupled to the plurality of local Kalman filters wherein receiving, from one or more sensors, sensor information may include receiving, from a plurality of sensors, individual sensor information about a three-dimensional position of the vehicle; wherein applying a distributed Kalman filter to the sensor information may include: for each local Kalman filter, applying the local Kalman filter to the individual sensor information received from an associated sensor of the plurality of sensors; applying the master Kalman filter to the results provided by at least some of the local Kalman filters; applying at least some of the local Kalman filters to a portion of the output of the master Kalman filter, the portion of the output may include an estimate of state conditioned on the sensor information; a covariance matrix associated with the estimate of state conditioned on the sensor information.

In Example 3. the subject matter of Example 2, may optionally include applying each of the local Kalman filter to the individual sensor information received from an associated sensor of the plurality of sensors may include satisfying the following formulae:

$$\hat{x} = P*(M^{-1}*m + H^T*R^{-1}*z)$$

$$P = (M^{-1} + H^T*R^{-1}*H)^{-1}$$

wherein $\hat{x}$ is the local Kalman filter estimate of state conditioned on the sensor information received by the local Kalman filter from an associated sensor of the plurality of sensors; P is the error covariance matrix of the local Kalman filter; m is the Master Kalman filter estimate of state conditioned using all sensor information; M is a covariance matrix associated with the Master Kalman filter estimate of state conditioned using all sensor information; H is the observational model of the local Kalman filter; R is the covariance matrix of the observational model of the local Kalman filter; and z is the sensor information received by the local Kalman filter from an associated sensor of the plurality of sensors.

In Example 4. the subject matter of Examples 2 or 3, may optionally include applying the master Kalman filter to the results provided by at least some of the local Kalman filters may include applying the Master Kalman filter using the following formulae:

$$\hat{x} = P\left[\sum_{i=1}^{n}(P_i^{-1}*\hat{x}_i) - M^{-1}*m\right]$$

$$P^{-1} = \left(\sum_{i=1}^{n} P_i^{-1}\right) - M^{-1}$$

wherein m is the Master Kalman filter estimate of state conditioned using all sensor information; M is a covariance matrix associated with the Master Kalman filter estimate of state conditioned using all sensor information; $P_i$ is the error covariance matrix of the i-th local Kalman filter; $\hat{x}_i$ is the i-th local Kalman filter estimate of state conditioned on the sensor information received by the local Kalman filter from an associated sensor of the plurality of sensors; P is the error covariance matrix of the local Kalman filters; and $\hat{x}$ is the master Kalman filter estimate of state conditioned on the sensor information received by all local Kalman filters from all associated sensors of the plurality of sensors.

In Example 5. the subject matter of Examples 1 to 4, may optionally include that the individual sensor information about a three-dimensional position of the vehicle may further include a mono-camera picture sensing at least one of: landmarks; physical pathway boundaries; or physical pathway slope.

In Example 6. the subject matter of Examples 1 to 5, may optionally include that the individual sensor information about a three-dimensional position of the vehicle may further include a Lidar sensing at least one of landmarks; physical pathway boundaries; or physical pathway slope.

In Example 7. the subject matter of Examples 1 to 6, may optionally include that the individual sensor information about a three-dimensional position of the vehicle may further include detecting the vehicle three dimensional position using a positioning system.

In Example 8. the subject matter of Examples 1 to 7, may optionally include that the individual sensor information about a three-dimensional position of the vehicle may further include at least one type of odometric information coming from an Inertial Measurement Unit of the vehicle.

In Example 9. the subject matter of Example 8, may optionally include that odometric information includes at least one of vehicle velocity, vehicle yaw angle change, vehicle pitch angle change, vehicle acceleration in an x, y, z direction, and vehicle position.

In Example 10. the subject matter of Examples 8 or 9, may optionally include that the odometric information may further further include visual information from one or a plurality of mono-camera sensors or one of a plurality of Lidar sensors.

Example 11. is a device for localizing a vehicle on a three-dimensional map that may be optionally include a memory configured to store the three-dimensional map; a receiver configured to receive from one or more sensors, sensor information about a three-dimensional position of the vehicle; and one or more processors configured to compute a distributed Kalman filter to the sensor information to determine the position of the vehicle on the three-dimensional map.

In Example 12. the subject matter of Example 11, may optionally include that the distributed Kalman filter may include a plurality of local Kalman filters and a master Kalman filter configured to be coupled to the plurality of local Kalman filters; wherein one or more processors are configured to: apply the individual sensor information about a three-dimensional position of the vehicle to the distributed Kalman filter; for each local Kalman filter, process the individual sensor information received from an associated sensor of the plurality of sensors; process, using the master Kalman filter, the results provided by at least some of the local Kalman filters; wherein a portion of the output of the master Kalman filter is processed using the local Kalman filters, the portion of the output of the master Kalman filter may optionally include: an estimate of state conditioned on the sensor information, and a covariance matrix associated with the estimate of state conditioned on the sensor information.

In Example 13. the subject matter of Example 12, may optionally include that the one or more processors are configured to process the individual sensor information using the local Kalman filters by applying the following formulae:

$$\hat{x} = P*(M^{-1}*m + H^T*R^{-1}*z)$$

$$P = (M^{-1} + H^T*R^{-1}*H)^{-1}$$

wherein $\hat{x}$ is the local Kalman filter estimate of state conditioned on the sensor information received by the local Kalman filter from an associated sensor of the plurality of sensors; P is the error covariance matrix of the local Kalman filter; m is the Master Kalman filter estimate of state conditioned using all sensor information; M is a covariance matrix associated with the Master Kalman filter estimate of state conditioned using all sensor information; H is the observational model of the local Kalman filter; R is the covariance matrix of the observational model of the local Kalman filter; and z is the sensor information received by the local Kalman filter from an associated sensor of the plurality of sensors.

In Example 14. the subject matter of Examples 12 or 13, may optionally include that the one or more processors are configured to process the results provided by at least some of the local Kalman filters; applying the Master Kalman filter using the following formulae:

$$\hat{x} = P\left[\sum_{i=1}^{n}(P_i^{-1}*\hat{x}_i) - M^{-1}*m\right]$$

$$P^{-1} = \left(\sum_{i=1}^{n} P_i^{-1}\right) - M^{-1}$$

wherein m is the Master Kalman filter estimate of state conditioned using all sensor information; M is a covariance matrix associated with the Master Kalman filter estimate of state conditioned using all sensor information; $P_i$ is the error covariance matrix of the i-th local Kalman filter; $\hat{x}_i$ is the i-th local Kalman filter estimate of state conditioned on the sensor information received by the local Kalman filter from an associated sensor of the plurality of sensors; P is the error covariance matrix of the local Kalman filters; $\hat{x}$ is the master Kalman filter estimate of state conditioned on the sensor information received by all local Kalman filters from all associated sensors of the plurality of sensors.

In Example 15. the subject matter of Examples 11 to 14, may optionally include that the receiver is further configured to receive information from a mono-camera sensing at least one of: landmarks; pathway boundaries; or pathway slope.

In Example 16. the subject matter of Examples 11 to 15, may optionally include that the receiver is further configured to receive information from a Lidar sensing at least one of: landmarks; physical pathway boundaries; or physical pathway slope.

In Example 17. the subject matter of Examples 11 to 16, may optionally include that the receiver is further configured to receive information from a position sensor configured to detect the vehicle three dimensional position using a positioning system.

In Example 18. the subject matter of Examples 11 to 17, may optionally include that the receiver is further configured to receive information from a sensor configured to detect at least one type of odometric information coming from the Inertial Measurement Unit of the vehicle.

In Example 19. the subject matter of Example 18, may optionally include that the sensor is configured to detect at least one type of odometric information comprising: vehicle velocity; vehicle yaw angle change; vehicle pitch angle change; vehicle acceleration in an x, y, z direction; or vehicle position.

In Example 20. the subject matter of Example 19, may optionally include that the sensor configured to detect at least one type of odometric information is further configured to detect visual information from one or a plurality of mono-camera sensor or one of a plurality of Lidar sensors.

Example 21. is a vehicle that may optionally include a device for localizing a vehicle on a three-dimensional map, the device comprising: a memory configured to store the three-dimensional map; a receiver configured to receive from one or more sensors, sensor information about a three-dimensional position of the vehicle; and one or more processors configured to compute a distributed Kalman filter to the sensor information to determine the position of the vehicle on the three-dimensional map.

Example 22. is a computer readable medium that may be storing a plurality of instructions implementing a method for sensing the position of a vehicle on a three-dimensional map, the method comprising: receiving, from one or more sensors, sensor information about a three-dimensional position of the vehicle; and applying a distributed Kalman filter to the sensor information to determine the position of the vehicle on the three-dimensional map.

Example 23. is a method of localization of a vehicle on a three-dimensional map; the three-dimensional map may include: map points identified by longitude information, latitude information and height information; and one or a plurality of pathways wherein each pathway has a boundary and a pathway boundary is defined by one or more lines connecting at least two map points with each other; the method further include: modelling a three dimensional shape of a pathway on a three-dimensional map; and identifying the position of the vehicle on a pathway of the three-dimensional map.

In Example 24. the subject matter of Example 23, may optionally include that modelling the three dimensional shape of a pathway on a three-dimensional map may further include approximating a shape of the pathway using a clothoid function.

In Example 25. the subject matter of Example 24, may optionally include that the clothoid curvature function is formed by the following formula:

$$C = C_{0vm} + C_{1vm} * L$$

wherein C is a measure of the curvature of the clothoid; $C_{0vm}$ is an initial clothoid curvature; $C_{1vm}$ is the rate of a clothoid curvature change with respect to a distance travelled by the vehicle; and L is a measure of distance travelled by the vehicle.

In Example 26. the subject matter of Example 25, may optionally include that a function to compute the initial curvature of the clothoid may include the following formula:

$$C_{0vm}\overset{\&}{=} C_{1vm} * v$$

wherein v is the velocity of the vehicle.

In Example 27. the subject matter of Example 26, may optionally include that a function to compute the rate of clothoid curvature change with respect to the distance travelled by the vehicle may include the following formula:

$$C_{1vm}\overset{\&}{=} \mathrm{noise}(t)$$

wherein noise(t) is a function that returns random values in a given time t.

In Example 28. the subject matter of Examples 23 to 27, may optionally include that identifying the position of the vehicle on a pathway may include: computing the horizontal coordinates of the vehicle; relating the vehicle pitch angle of the vehicle to the clothoid parameters; and computing the height position of the vehicle.

In Example 29. the subject matter of Example 28, may optionally include that computing the horizontal coordinates of the vehicle may include applying the following formulae:

$$\dot{x} = v * \cos(\Theta)$$
$$\dot{y} = v * \sin(\Theta)$$
$$\dot{\Theta} = \frac{v}{L} * \tan(\varphi)$$

Wherein x and y are coordinates; $\varphi$ is the yaw angle; $\Theta$ is the vehicle heading angle; and L is the length between the vehicle axes.

In Example 30. the subject matter of Examples 28 or 29, may optionally include that relating the pitch angle of the vehicle to the clothoid parameters may include applying the following formula:

$$\dot{\alpha} = C_{0vm} * v$$

wherein $\dot{\alpha}$ is the pitch angle of the vehicle; v is the vehicle velocity; and $C_{0vm}$ is a clothoid parameter.

In Example 31. the subject matter of Examples 28 to 30, may optionally include that computing the height position of the vehicle may include applying the following formula:

$$h = \frac{C_{0vm}}{2} * d^2 + \frac{C_{1vm}}{6} * d^3$$

wherein $C_{0vm}$ and $C_{1vm}$ are clothoid parameters; d is a lookahead distance; and h is an estimated height on the pathway.

Example 32. is a device for localizing a vehicle on a three-dimensional map, that may optionally include a memory configured to store the three-dimensional map comprising: map points identified by longitude information, latitude information and height information; and one or a plurality of pathways wherein each pathway has a boundary and a pathway boundary is defined by one or more lines connecting at least two map points with each other; one or more processors configured to model a three dimensional shape of a pathway on a three-dimensional map; and identify the position of the vehicle on a pathway of the three-dimensional map.

In Example 33. the subject matter of Example 32, may optionally include that the one or more processors are configured to model the three dimensional shape of the pathway on a three-dimensional map by approximating a shape of the pathway using a clothoid function.

In Example 34. the subject matter of Example 33, may optionally include that the one or more processors are configured to apply a clothoid curvature function formed by the following formula:

$$C = C_{0vm} + C_{1vm} * L$$

wherein C is a measure of the curvature of the clothoid: $C_{0vm}$ is an initial clothoid curvature; $C_{1vm}$ is the rate of a clothoid curvature change with respect to a distance travelled by the vehicle; and L is a measure of distance travelled by the vehicle.

In Example 35. the subject matter of Example 34, may optionally include that the one or more processors are configured to apply a function to compute the initial curvature of the clothoid formed by the following formula:

$$C_{0vm}\& = C_{1vm} * v$$

wherein v is the velocity of the vehicle.

In Example 36. the subject matter of Example 35, may optionally include that the one or more processors are configured to apply a function to compute the rate of clothoid curvature change with respect to the distance travelled by the vehicle formed by the following formula:

$$C_{1vm}\& = \text{noise}(t)$$

wherein noise(t) is a function that returns random values in a given time t.

In Example 37. the subject matter of Examples 32 to 36, may optionally include that the one or more processors are configured to identify the position of the vehicle on a pathway by: computing the horizontal coordinates of the vehicle; relating the vehicle pitch angle of the vehicle to the clothoid parameters; and computing the height position of the vehicle.

In Example 38. the subject matter of Example 37, may optionally include that the one or more processors are configured to compute the horizontal coordinates of the vehicle by applying the following formulae:

$$x\& = v * \cos(\Theta)$$

$$y\& = v * \sin(\Theta)$$

$$\varphi\& = \frac{v}{L} * \tan(\varphi)$$

wherein x and y are coordinates; $\varphi$ is the yaw angle; $\Theta$ is the vehicle heading angle; and L is the length between the vehicle axes.

In Example 39. the subject matter of Examples 37 or 38, may optionally include that the one or more processors are configured to relate the pitch angle of the vehicle to the clothoid parameters by applying the following formula:

$$\alpha\& = C_{0vm} * v$$

Wherein $\alpha\&$ is the pitch angle of the vehicle; v is the vehicle velocity; and $C_{0vm}$ is a clothoid parameter.

In Example 40. the subject matter of Examples 37 to 39, may optionally include that the one or more processors are configured to compute the height position of the vehicle by applying the following formula:

$$h = \frac{C_{0vm}}{2} * d^2 + \frac{C_{1vm}}{6} * d^3$$

Wherein $C_{0vm}$ and $C_{1vm}$ are clothoid parameters; d is a look-ahead distance; and h is an estimated height on the pathway.

Example 41. is a vehicle comprising: a device for localizing a vehicle on a three-dimensional map, a memory configured to store the three-dimensional map comprising: map points identified by longitude information, latitude information and height information; and one or a plurality of pathways wherein each pathway has a boundary and a pathway boundary is defined by one or more lines connecting at least two map points with each other; one or more processors configured to model a three dimensional shape of a pathway on a three-dimensional map; and identify the position of the vehicle on a pathway of the three-dimensional map.

Example 42. is a computer readable medium storing a plurality of instructions implementing a method for sensing the position of a vehicle on a three-dimensional map, the method comprising: receiving, from one or more sensors, sensor information about a three-dimensional position of the vehicle; and applying a distributed Kalman filter to the sensor information to determine the position of the vehicle on the three-dimensional map.

While the Disclosure has been particularly shown and described with reference to specific embodiments, it should be understood by those skilled in the art that various changes in form and detail may be made therein without departing from the spirit and scope of the Disclosure as defined by the appended claims. The scope of the Disclosure is thus indicated by the appended claims and all changes which come within the meaning and range of equivalency of the claims are therefore intended to be embraced.

What is claimed is:

1. A method for sensing a position of a vehicle on a three-dimensional map, the method comprising:
   receiving, from one or more sensors, sensor information about a three-dimensional position of the vehicle; and
   applying a distributed Kalman filter to the sensor information to determine the position of the vehicle on the three-dimensional map,
   wherein the distributed Kalman filter comprises a plurality of local Kalman filters, and a master Kalman filter coupled to the plurality of local Kalman filters;
   wherein the three-dimensional map comprises an approximation of a shape of a pathway of the three-dimensional map based on a clothoid curvature function; and
   wherein the clothoid curvature function is based on an initial clothoid curvature, a rate of clothoid curvature change with respect to a distance travelled by the vehicle, and a measure of the distance travelled by the vehicle.

2. The method of claim 1,
wherein receiving, from the one or more sensors, the sensor information comprises
receiving, from a plurality of sensors, individual sensor information about the three-dimensional position of the vehicle;
wherein applying the distributed Kalman filter to the sensor information comprises:
applying each local Kalman filter, of the plurality of local Kalman filters, to the individual sensor information received from an associated sensor of the plurality of sensors,
applying the master Kalman filter to results provided by at least some of the plurality of local Kalman filters, and
applying at least some of the plurality of local Kalman filters to a portion of an output of the master Kalman filter; and
wherein the portion of the output of the master Kalman filter comprises:
an estimate of a state conditioned on the sensor information, and
a covariance matrix associated with the estimate of the state conditioned on the sensor information.

3. The method of claim 2,
wherein applying each local Kalman filter, of the plurality of local Kalman filters, to the individual sensor information received from the associated sensor of the plurality of sensors comprises
satisfying the following formulae:

$$\hat{x} = P * (M^{-1} * m + H^T * R^{-1} * z), \text{ and}$$

$$P = (M^{-1} + H^T * R^{-1} * H)^{-1}; \text{ and}$$

wherein
$\hat{x}$ is a local Kalman filter estimate of the state conditioned on the sensor information received by a local Kalman filter of the plurality of local Kalman filters from an associated sensor of the plurality of sensors,
P is an error covariance matrix of the local Kalman filter,
m is a master Kalman filter estimate of a state conditioned using all sensor information,
M is a covariance matrix associated with the master Kalman filter estimate of the state conditioned using all sensor information,
H is an observational model of the local Kalman filter,
R is a covariance matrix of the observational model of the local Kalman filter, and
z is the sensor information received by the local Kalman filter from the associated sensor of the plurality of sensors.

4. The method of claim 2,
wherein applying the master Kalman filter to the results provided by at least some of the local Kalman filters comprises applying the master Kalman filter using the following formulae:

$$\hat{x} = P \left[ \sum_{i=1}^{n} (P_i^{-1} * \hat{x}_i) - M^{-1} * m \right], \text{ and}$$

$$P^{-1} = \left( \sum_{i=1}^{n} P_i^{-1} \right) - M^{-1}; \text{ and}$$

wherein
m is a master Kalman filter estimate of a state conditioned using all sensor information,
M is a covariance matrix associated with the master Kalman filter estimate of the state conditioned using all sensor information,
$P_i$ is an error covariance matrix of an i-th local Kalman filter of the plurality of local Kalman filters,
$\hat{x}_i$ is an i-th local Kalman filter estimate of the state conditioned on the sensor information received by the i-th local Kalman filter from an associated sensor of the plurality of sensors,
P is an error covariance matrix of the plurality of local Kalman filters, and
$\hat{x}$ is the master Kalman filter estimate of the state conditioned on the sensor information received by all local Kalman filters of the plurality of local Kalman filters from all associated sensors of the plurality of sensors.

5. The method of claim 2,
wherein the individual sensor information about the three-dimensional position of the vehicle comprises:
a mono-camera picture, or
a Lidar sensing at least one of:
landmarks,
physical pathway boundaries, or
physical pathway slope.

6. The method of claim 2,
wherein the individual sensor information about the three-dimensional position of the vehicle comprises at least one type of odometric information from an Inertial Measurement Unit of the vehicle; and
wherein the at least one type of odometric information comprises
vehicle velocity information,
vehicle yaw angle change information,
vehicle pitch angle change information,
vehicle acceleration in an x, y, z direction information, or
vehicle position information.

7. The method of claim 2,
wherein the individual sensor information about the three-dimensional position of the vehicle comprises at least one type of odometric information from an Inertial Measurement Unit of the vehicle; and
wherein the odometric information comprises visual information from one or more mono-camera sensors, or visual information from one of a plurality of Lidar sensors.

8. A device for localizing a vehicle on a three-dimensional map, the device comprising:
a memory configured to store the three-dimensional map;
a receiver configured to receive, from one or more sensors, sensor information about a three-dimensional position of the vehicle; and
one or more processors configured to compute a distributed Kalman filter to the sensor information to determine the three-dimensional position of the vehicle on the three-dimensional map, wherein the distributed Kalman filter comprises a plurality of local Kalman filters, and a master Kalman filter configured to be coupled to the plurality of local Kalman filters;
wherein the three-dimensional map comprises an approximation of a shape of a pathway of the three-dimensional map based on a clothoid curvature function; and
wherein the clothoid curvature function is based on an initial clothoid curvature, a rate of clothoid curvature change with respect to a distance travelled by the vehicle, and a measure of the distance travelled by the vehicle.

9. The device of claim 8,
wherein the one or more sensors comprise a plurality of sensors;
wherein the one or more processors are configured to:
   apply the individual sensor information about the three-dimensional position of the vehicle to the distributed Kalman filter,
   process for each local Kalman filter, of the plurality of local Kalman filters, the individual sensor information received from an associated sensor of the plurality of sensors, and
   process, using the master Kalman filter, results provided by at least some of the plurality of local Kalman filters;
wherein a portion of an output of the master Kalman filter is processed using the plurality of local Kalman filters; and
wherein the portion of the output of the master Kalman filter comprises:
   an estimate of a state conditioned on the sensor information, and
   a covariance matrix associated with the estimate of the state conditioned on the sensor information.

10. The device of claim 9,
wherein the one or more processors are configured to process the individual sensor information using the plurality of local Kalman filters by applying the following formulae:

$$\hat{x} = P * (M^{-1} * m + H^T * R^{-1} * z), \text{ and}$$

$$P = (M^{-1} + H^T * R^{-1} * H)^{-1}; \text{ and}$$

wherein
   $\hat{x}$ is a local Kalman filter estimate of the state conditioned on the sensor information received by a local Kalman filter of the plurality of local Kalman filters from an associated sensor of the plurality of sensors,
   P is an error covariance matrix of the local Kalman filter,
   m is a master Kalman filter estimate of a state conditioned using all sensor information,
   M is a covariance matrix associated with the master Kalman filter estimate of the state conditioned using all sensor information,
   H is an observational model of the local Kalman filter,
   R is a covariance matrix of the observational model of the local Kalman filter, and
   z is the sensor information received by the local Kalman filter from the associated sensor of the plurality of sensors.

11. The device of claim 9,
wherein the one or more processors are configured to process the results provided by at least some of the plurality of local Kalman filters applying the master Kalman filter using the following formulae:

$$\hat{x} = P\left[\sum_{i=1}^{n}(P_i^{-1} * \hat{x}_i) - M^{-1} * m\right], \text{ and}$$

$$P^{-1} = \left(\sum_{i=1}^{n} P_i^{-1}\right) - M^{-1}; \text{ and}$$

wherein
   m is the master Kalman filter estimate of a state conditioned using all sensor information,
   M is a covariance matrix associated with the master Kalman filter estimate of the state conditioned using all sensor information,
   $P_i$ is an error covariance matrix of an i-th local Kalman filter of the plurality of local Kalman filters,
   $\hat{x}_i$ is an i-th local Kalman filter estimate of the state conditioned on the sensor information received by the i-th local Kalman filter from an associated sensor of the plurality of sensors,
   P is an error covariance matrix of the plurality of local Kalman filters, and
   $\hat{x}$ is the master Kalman filter estimate of the state conditioned on the sensor information received by all local Kalman filters of the plurality of local Kalman filters from all associated sensors of the plurality of sensors.

12. The device of claim 9,
wherein the receiver is further configured to receive information from a sensor; and
wherein the sensor is configured to detect at least one type of odometric information from the Inertial Measurement Unit of the vehicle.

13. The device of claim 9,
wherein the receiver is further configured to receive information from a sensor;
wherein the sensor is configured to detect at least one type of odometric information from the Inertial Measurement Unit of the vehicle; and
wherein the at least one type of odometric information comprises:
   vehicle velocity information,
   vehicle yaw angle change information,
   vehicle pitch angle change information,
   vehicle acceleration in an x, y, z direction information, or
   vehicle position information.

14. The device of claim 9,
wherein the receiver is further configured to receive information from a sensor; and
wherein the sensor is configured to:
   detect at least one type of odometric information, and
   detect visual information from one or more mono-camera sensors or visual information from one of a plurality of Lidar sensors.

15. A method for localizing a vehicle on a three-dimensional map,
the three-dimensional map comprising:
   map points identified by longitude information, latitude information and height information; and
   one or more pathways,
      wherein each pathway, of the one or more pathways, has a boundary, and a pathway boundary defined by one or more lines connecting at least two map points with each other;

the method comprising:
   modelling a three dimensional shape of a pathway of the three-dimensional map; and
   identifying a position of the vehicle on the pathway of the three-dimensional map;
wherein modelling the three dimensional shape of the pathway of the three-dimensional map comprises approximating a shape of the pathway using a clothoid curvature function; and
wherein the clothoid curvature function is based on an initial clothoid curvature, a rate of clothoid curvature change with respect to a distance travelled by the vehicle, and a measure of the distance travelled by the vehicle.

16. The method of claim 15,
wherein the clothoid curvature function is formed by the following formula:

$$C = C_{0vm} + C_{1vm} * L; \text{ and}$$

wherein
   C is a measure of a curvature of a clothoid,
   $C_{0vm}$ is the initial clothoid curvature,
   $C_{1vm}$ is the rate of clothoid curvature change with respect to the distance travelled by the vehicle, and
   L is the measure of the distance travelled by the vehicle.

17. The method of claim 16,
wherein a function to compute the initial clothoid curvature comprises the following formula:

$$\dot{C} = C_{0vm} + C_{1vm} * v; \text{ and}$$

wherein
   v is the velocity of the vehicle.

18. The method of claim 16,
wherein a function to compute the rate of clothoid curvature change with respect to the distance travelled by the vehicle comprises the following formula:

$$\dot{C}_{1vm} = \text{noise}(t); \text{ and}$$

wherein
   noise(t) is a function that returns random values in a given time t.

19. The method of claim 16,
wherein identifying the position of the vehicle on the pathway comprises:
   computing horizontal coordinates of the vehicle,
   relating a vehicle pitch angle of the vehicle to a clothoid parameter, and
   computing a height position of the vehicle.

20. The method of claim 19,
wherein computing the horizontal coordinates of the vehicle comprises applying the following formulae:

$$\dot{x} = v * \cos(\Theta),$$

$$\dot{y} = v * \sin(\Theta), \text{ and}$$

$$\dot{\Theta} = \frac{v}{L} * \tan(\varphi); \text{ and}$$

wherein
   x and y are coordinates,
   φ is a yaw angle,
   Θ is a vehicle heading angle, and
   L is a length between vehicle axes.

* * * * *